(12) United States Patent
Kawanishi

(10) Patent No.: US 10,816,730 B2
(45) Date of Patent: Oct. 27, 2020

(54) OPTICAL FIBER COATING REMOVAL DEVICE, EXTERNAL DEVICE, OPTICAL FIBER COATING REMOVAL SYSTEM, AND OPTICAL FIBER COATING REMOVAL METHOD

(71) Applicant: FUJIKURA LTD., Tokyo (JP)

(72) Inventor: Noriyuki Kawanishi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 15/541,947

(22) PCT Filed: Mar. 6, 2017

(86) PCT No.: PCT/JP2017/008726
§ 371 (c)(1),
(2) Date: Jul. 6, 2017

(87) PCT Pub. No.: WO2018/150595
PCT Pub. Date: Aug. 23, 2018

(65) Prior Publication Data
US 2018/0275345 A1 Sep. 27, 2018

(30) Foreign Application Priority Data
Feb. 14, 2017 (JP) .................. 2017-025329

(51) Int. Cl.
*G02B 6/245* (2006.01)
*G02B 6/44* (2006.01)
*G02B 6/255* (2006.01)

(52) U.S. Cl.
CPC .......... *G02B 6/245* (2013.01); *G02B 6/4497* (2013.01); *G02B 6/2553* (2013.01);
(Continued)

(58) Field of Classification Search
CPC ......... Y10T 156/1153; Y10T 156/1184; Y10T 156/1911; Y10T 156/1967; Y10S 156/923
See application file for complete search history.

(56) References Cited

U.S. PATENT DOCUMENTS 5,070,232 A * 12/1991 Martin .................... F26B 23/06
                                                          219/390
5,346,521 A *  9/1994 Lin ...................... G02B 6/2835
                                                           65/152
(Continued)

FOREIGN PATENT DOCUMENTS

CN          1209556 A       3/1999
CN        101164001 A       4/2008
(Continued)

OTHER PUBLICATIONS https://americailsintech.com/wp-content/uploads/2017/12/Swift_S5_User_Manual.pdf (Year: 2017).*
(Continued)

*Primary Examiner* — Mark A Osele
(74) *Attorney, Agent, or Firm* — Osha Liang LLP

(57) ABSTRACT

An optical fiber coating removal device which heats a coating of an optical fiber with a heater and removes the coating with a blade includes a communicator which receives information based on optical fiber type information to specify an optical fiber type selected by a user from among a plurality of optical fiber types, transmitted from an external device to which the optical fiber type information has been input, and a heater which heats a coating of an optical fiber using the received information based on the optical fiber type information. The heater can heat a coating under a plurality of conditions according to the optical fiber type information.

16 Claims, 23 Drawing Sheets

(52) U.S. Cl.
CPC ...... *Y10S 156/923* (2013.01); *Y10T 156/1153* (2015.01); *Y10T 156/1184* (2015.01); *Y10T 156/1911* (2015.01); *Y10T 156/1967* (2015.01)

(56) References Cited

U.S. PATENT DOCUMENTS

| | | | | |
|---|---|---|---|---|
| 2012/0248093 | A1* | 10/2012 | Ulrich | H02G 1/128 219/600 |
| 2012/0279359 | A1 | 11/2012 | Homma et al. | |
| 2013/0247728 | A1 | 9/2013 | Sekine et al. | |

FOREIGN PATENT DOCUMENTS

| | | |
|---|---|---|
| CN | 102692676 A | 9/2012 |
| CN | 103323913 A | 9/2013 |
| EP | 0899594 A2 | 3/1999 |
| JP | H01-090003 U | 6/1989 |
| JP | H05-119226 A | 5/1993 |
| JP | 2004-198977 A | 7/2004 |
| JP | 2006-58474 A | 3/2006 |
| JP | 5166391 B2 | 3/2013 |
| JP | 2013-195840 A | 9/2013 |
| KR | 10-2005-0081156 A | 8/2005 |
| KR | 10-2012-0075486 A | 7/2012 |
| KR | 10-2013-0140846 A | 12/2013 |
| WO | 2006112675 A1 | 10/2006 |

OTHER PUBLICATIONS

UCL Swift S5 brochure, UCLSWIFT Co. Ltd., http://www.ilsintech.com/eng/sub/s2.asp?code=1&prodcode=P00002 (Year: 2013).*
America Ilsintech, Termination of a LC APC Connector using a S5 Fusion Splicer, Screen Shot at 0:29/4:25, Dec. 18, 2015, YouTube. (Year: 2015).*
America Ilsintech, Termination of a LC APC Connector using a S5 Fusion Splicer, Screen Shot at 0:36/4:25, Dec. 18, 2015, YouTube. (Year: 2015).*
America Ilsintech, Termination of a Splice on Connector to 250 um fiber using a S5 Fusion Splicer, Screen Shot at 1:05/5:03, Dec. 30, 2015, YouTube. (Year: 2015).*
America Ilsintech, Termination of a Splice on Connector to 250 um fiber using a S5 Fusion Splicer, Screen Shot at 1:11/5:03, Dec. 30, 2015, YouTube. (Year: 2015).*
America Ilsintech, Termination of a Splice on Connector to 250 um fiber using a S5 Fusion Splicer, Screen Shot at 1:17/5:03, Dec. 30, 2015, YouTube. (Year: 2015).*
America Ilsintech, Termination of a Splice on Connector to 250 um fiber using a S5 Fusion Splicer, Screen Shot at 1:22/5:03, Dec. 30, 2015, YouTube. (Year: 2015).*
http://ilsintech.com/admin/pds/prod/Swift%20S5%20%EC%82%AC%EC%9A%A9%EC%9E%90%20%EB%A9%94%EB%89%B4%EC%96%BC%20%EC%98%81%EB%Ac%B8%2013.11.13.pdf User Manual Optical Fiber Arc Fusion Splicer Swift S5, pp. 1-103, ilsintech.com (Year: 2013).*
International Telecommunication Union, "Characteristics of a non-zero dispersion-shifted single-mode optical fibre and cable"; Telecommunication Standardization Sector of ITU, G.655; Nov. 2009 (26 pages).
Office Action issued in corresponding Japanese Application No. 2017-226170 dated Jan. 23, 2018 (6 pages).
Office Action issued in corresponding Korean Application No. 10-2017-7017540 dated Oct. 16, 2018 (13 pages).
Office Action issued in corresponding Japanese Application No. 2017-025329 dated May 16, 2017 (7 pages).
Office Action issued in corresponding Japanese Application No. 2017-025329 dated Sep. 26, 2017 (5 pages).
Office Action issued in corresponding Japanese Application No. 2017-226170 dated May 29, 2018 (6 pages).
Extended European Search Report issued in corresponding European Patent Application 17731798.9 dated Mar. 15, 2019 (10 pages).
Korean Office Action issued in corresponding application No. 10-2017-7017540 dated Apr. 26, 2019 (4 pages).
Nyfors Teknologi Ab, "New fully automatic thermal stripper from Nyfors Teknologi AB-the AUTOSTRIPPER3", Jan. 31, 2017, pp. 135-70, XP055708959 (1 page).
Autoprep Nyfors Teknologi Ab, "AutoPrep II High speed fiber preparation system for production environments", Jan. 1, 2012, XP055708966 (1 page).

* cited by examiner

FIG. 5

| CONNECTION PROGRAM NUMBER | 1 |
|---|---|
| CONNECTION PROGRAM NAME | NZ12 TYPE-P ITUT 655 |
| DISCHARGE HEAT CURRENT | a1 (mA) |
| DISCHARGE HEAT TIME | t10 (sec) |
| OPTICAL FIBER INSERTION AMOUNT | L1 ($\mu$m) |
| COATING HEAT TEMPERATURE | T1 (°C) |
| COATING HEAT TIME | t1 (sec) |

| CONNECTION PROGRAM NUMBER | 2 |
|---|---|
| CONNECTION PROGRAM NAME | SM4 TYPE-C ITUT 652 |
| DISCHARGE HEAT CURRENT | a2 (mA) |
| DISCHARGE HEAT TIME | t20 (sec) |
| OPTICAL FIBER INSERTION AMOUNT | L2 ($\mu$m) |
| COATING HEAT TEMPERATURE | T2 (°C) |
| COATING HEAT TIME | t2 (sec) |

| CONNECTION PROGRAM NUMBER | 3 |
|---|---|
| CONNECTION PROGRAM NAME | NZ12 TYPE-P ITUT 655 |
| DISCHARGE HEAT CURRENT | a3 (mA) |
| DISCHARGE HEAT TIME | t30 (sec) |
| OPTICAL FIBER INSERTION AMOUNT | L3 ($\mu$m) |
| COATING HEAT TEMPERATURE | T3 (°C) |
| COATING HEAT TIME | t3 (sec) |

⋮

| COATING HEAT TEMPERATURE | T3 (°C) |
|---|---|
| COATING HEAT TIME | t3 (sec) |

| COATING HEAT PROGRAM NUMBER | 1 |
|---|---|
| COATING HEAT TEMPERATURE | T1 (°C) |
| COATING HEAT TIME | t1 (sec) |

| COATING HEAT PROGRAM NUMBER | 2 |
|---|---|
| COATING HEAT TEMPERATURE | T2 (°C) |
| COATING HEAT TIME | t2 (sec) |

| COATING HEAT PROGRAM NUMBER | 3 |
|---|---|
| COATING HEAT TEMPERATURE | T3 (°C) |
| COATING HEAT TIME | t3 (sec) |

| CONNECTION PROGRAM NUMBER | 1 |
|---|---|
| CONNECTION PROGRAM NAME | NZ12 TYPE-P ITUT 655 |
| DISCHARGE HEAT CURRENT | a1 (mA) |
| DISCHARGE HEAT TIME | t10 (sec) |
| OPTICAL FIBER INSERTION AMOUNT | L1 ($\mu$m) |
| CORE NUMBER | Na |
| COATING DIAMETER | Ra |
| COATING MATERIAL | ○○ |

| CONNECTION PROGRAM NUMBER | 2 |
|---|---|
| CONNECTION PROGRAM NAME | SM4 TYPE-C ITUT 652 |
| DISCHARGE HEAT CURRENT | a2 (mA) |
| DISCHARGE HEAT TIME | t20 (sec) |
| OPTICAL FIBER INSERTION AMOUNT | L2 ($\mu$m) |
| CORE NUMBER | Nb |
| COATING DIAMETER | Rb |
| COATING MATERIAL | △△ |

| CONNECTION PROGRAM NUMBER | 3 |
|---|---|
| CONNECTION PROGRAM NAME | NZ12 TYPE-P ITUT 655 |
| DISCHARGE HEAT CURRENT | a3 (mA) |
| DISCHARGE HEAT TIME | t30 (sec) |
| OPTICAL FIBER INSERTION AMOUNT | L3 ($\mu$m) |
| CORE NUMBER | Nc |
| COATING DIAMETER | Rc |
| COATING MATERIAL | □□ |

| COATING HEAT PROGRAM NUMBER | 1 |
|---|---|
| CORE NUMBER | Na |
| COATING DIAMETER | Ra |
| COATING MATERIAL | ○○ |
| COATING HEAT TEMPERATURE | T1 (°C) |
| COATING HEAT TIME | t1 (sec) |

| COATING HEAT PROGRAM NUMBER | 2 |
|---|---|
| CORE NUMBER | Nb |
| COATING DIAMETER | Rb |
| COATING MATERIAL | △△ |
| COATING HEAT TEMPERATURE | T2 (°C) |
| COATING HEAT TIME | t2 (sec) |

| COATING HEAT PROGRAM NUMBER | 3 |
|---|---|
| CORE NUMBER | Nc |
| COATING DIAMETER | Rc |
| COATING MATERIAL | □□ |
| COATING HEAT TEMPERATURE | T3 (°C) |
| COATING HEAT TIME | t3 (sec) |

| HEAT RECIPE NUMBER | 1 |
|---|---|
| HEAT RECIPE NAME | SM4ribbon Type-C ITUT G652 |
| COATING HEAT TEMPERATURE | T1 (°C) |
| COATING HEAT TIME | t1 (sec) |

| HEAT RECIPE NUMBER | 2 |
|---|---|
| HEAT RECIPE NAME | NZ12ribbon Type-P ITUT G655 |
| COATING HEAT TEMPERATURE | T2 (°C) |
| COATING HEAT TIME | t2 (sec) |

| HEAT RECIPE NUMBER | 3 |
|---|---|
| HEAT RECIPE NAME | SM1single Type-A ITUT G652 |
| COATING HEAT TEMPERATURE | T3 (°C) |
| COATING HEAT TIME | t3 (sec) |

⋮

OPTICAL FIBER COATING REMOVAL DEVICE, EXTERNAL DEVICE, OPTICAL FIBER COATING REMOVAL SYSTEM, AND OPTICAL FIBER COATING REMOVAL METHOD

TECHNICAL FIELD

One or more embodiments of the present invention relate to an optical fiber coating removal device, an external device, an optical fiber coating removal system, and an optical fiber coating removal method.

CROSS-REFERENCE TO RELATED APPLICATIONS

The present application claims priority based on Japanese Patent Application No. 2017-025329 filed on Feb. 14, 2017, the contents of which are incorporated herein by reference.

BACKGROUND

In order to connect optical fibers to each other, there is an optical fiber coating removal device which removes a coating at an end portion of each optical fiber. Some optical fiber coating removal devices include a heater which heats a coating of an optical fiber (for example, see Patent Documents 1 and 2).

In this type of optical fiber coating removal device, a blade is put in a coating of an optical fiber, the coating at an end portion to be removed is heated by a heater to soften the coating, and the softened coating is extracted to remove the coating of the optical fiber.

PRIOR ART DOCUMENTS

Patent Documents

[Patent Document 1] Japanese Unexamined Utility Model Application, First Publication No. H01-90003
[Patent Document 2] Japanese Patent No. 5166391

When heating is performed in order to remove a coating of an optical fiber, it is necessary to set a heat condition. However, conventionally, there have been a small number of coating removal types, and therefore a frequency of changing a heat condition in an optical fiber connection workplace has not been high.

In recent years, however, the types of coating material of an optical fiber and a structure thereof have increased drastically. For example, various ultraviolet-curable resins have been developed in order to improve a bending loss of an optical fiber. An optimum coating heat temperature depends on the types of these resins. In an optical fiber connection workplace, it is necessary to change a set temperature according to various types of new and old coating materials.

In addition, a standard coating diameter of a single core optical fiber has been conventionally only 250 μm or 900 μm. However, coating diameters of 200 μm and 500 μm have also been standardized. A tape of a tape type optical fiber having a thickness of 300 μm has appeared in addition to a tape having a thickness of 400 μm. In addition, in recent years, an optical fiber having a thickness of 250 μm or 200 μm has also appeared as an intermittently fixed tape type optical fiber. In an optical fiber connection workplace, it is necessary to adjust a coating heat condition according to a coating diameter or the core number (single core optical fiber, 4-core tape type optical fiber, 8-core tape type optical fiber, 12-core tape type optical fiber).

The optical fiber coating removal device has a function of changing a setting of a heat condition. However, as described above, an optical fiber has been diversified, a frequency of changing a setting of a heat condition has been increased in a connection workplace, and labor for an operation of changing a setting of a coating heat condition has been increased.

SUMMARY

One or more embodiments of the present invention provide an optical fiber coating removal device, an external device, an optical fiber coating removal system, and an optical fiber coating removal method capable of reducing labor for an operation of changing a setting of a coating heat condition.

A first aspect of one or more embodiments of the present invention provides an optical fiber coating removal device which heats a coating of an optical fiber with a heater and removes the coating with a blade, including a communicator which receives information based on optical fiber type information to specify an optical fiber type selected by a user from among a plurality of optical fiber types, transmitted from an external device to which the optical fiber type information has been input, and a heater which heats a coating of an optical fiber using the received information based on the optical fiber type information, in which the heater can heat a coating under a plurality of conditions according to the optical fiber type information.

A second aspect of one or more embodiments of the present invention provides the optical fiber coating removal device according to the first aspect, in which the optical fiber type information may include coating heat condition information to specify a coating heat condition of the optical fiber, the communicator may receive the coating heat condition information as the information based on the optical fiber type information, and the heater may heat a coating of the optical fiber under a coating heat condition specified by the received coating heat condition information.

A third aspect of one or more embodiments of the present invention provides the optical fiber coating removal device according to the first aspect, in which the communicator may receive information based on a power-saving operation-setting instruction for the optical fiber coating removal device, transmitted from the external device, and the heater may control preheating of the heater using the received information based on the power-saving operation-setting instruction.

A fourth aspect of one or more embodiments of the present invention provides the optical fiber coating removal device according to the first aspect, further including a buzzer sound outputter which outputs a buzzer sound, in which the communicator may receive information based on a buzzer sound volume-setting instruction for the optical fiber coating removal device, transmitted from the external device, the buzzer sound outputter may output a buzzer sound using the received information based on the buzzer sound volume-setting instruction, and the buzzer sound outputter may be able to output a buzzer sound with a plurality of buzzer sound volumes according to the buzzer sound volume-setting instruction.

A fifth aspect of one or more embodiments of the present invention provides the optical fiber coating removal device according to the first aspect, further including a maintenance information acquisitor which acquires at least one or more of a capacity of a built-in battery, the number of times of charging and discharging the built-in battery, the number of times of use of the blade, and occurrence of abnormality, serving as maintenance information, in which the communicator may transmit information based on the acquired maintenance information, and the external device may output the maintenance information using the received information based on the maintenance information.

A sixth aspect of one or more embodiments of the present invention provides the optical fiber coating removal device according to the first aspect, in which the communicator may transmit information based on identification information of the optical fiber coating removal device, and the external device may output the identification information of the optical fiber coating removal device using the received information based on the identification information.

A seventh aspect of one or more embodiments of the present invention provides the optical fiber coating removal device according to any one of the first to sixth aspects, in which the external device may be a fusion splicer which performs fusion splicing using a connection program selected out of a plurality of connection programs corresponding to optical fiber types, and inputs information of an optical fiber type included in the connection program selected as the optical fiber type information.

An eighth aspect of one or more embodiments of the present invention provides the optical fiber coating removal device according to the second aspect, in which the connection program selected may further include the coating heat condition information of the optical fiber, the communicator may receive the coating heat condition information transmitted from the fusion splicer as the information based on the optical fiber type information, and the heater may heat a coating of the optical fiber using the received coating heat condition information under a coating heat condition specified by the coating heat condition information.

A ninth aspect of one or more embodiments of the present invention provides the optical fiber coating removal device according to any one of the first to eighth aspects, further including a storage which stores the received coating heat condition information as set coating heat condition information, in which the communicator may transmit the set coating heat condition information, and the external device may output the received coating heat condition information.

A tenth aspect of one or more embodiments of the present invention provides an external device which inputs information used for heat a coating in an optical fiber coating removal device which heats a coating of an optical fiber with a heater and removes the coating with a blade, including an inputter which inputs optical fiber type information to specify an optical fiber type selected by a user from among a plurality of optical fiber types, and a communicator which transmits information based on the input optical fiber type information, in which the optical fiber coating removal device can heat a coating of an optical fiber with the heater using the received information based on the optical fiber type information, and the heater can heat a coating under a plurality of conditions according to the optical fiber type information.

An eleventh aspect of one or more embodiments of the present invention provides the external device according to the tenth aspect, in which the optical fiber type information may include coating heat condition information to specify a coating heat condition of the heater, the communicator may transmit the coating heat condition information included in the input optical fiber type information, and the optical fiber coating removal device may receive the coating heat condition information, and may heat a coating of an optical fiber using the received coating heat condition information under a coating heat condition specified by the coating heat condition information.

A twelfth aspect of one or more embodiments of the present invention provides the external device according to the tenth aspect, further including an outputter which outputs information, in which the optical fiber coating removal device may detect at least one or more of a capacity of a built-in battery, the number of times of charging and discharging the built-in battery, the number of times of use of the blade, and occurrence of abnormality, serving as maintenance information, and may transmit information based on the detected maintenance information, the communicator may receive information based on the maintenance information, and the outputter may output the maintenance information based on the received information based on the maintenance information.

A thirteenth aspect of one or more embodiments of the present invention provides the external device according to any one of the tenth to twelfth aspects, in which the external device may be a fusion splicer which performs fusion splicing using a connection program selected out of a plurality of connection programs corresponding to optical fiber types, and inputs information of an optical fiber type included in the connection program selected as the optical fiber type information.

A fourteenth aspect of one or more embodiments of the present invention provides the external device according to the thirteenth aspect, in which the connection program selected may further include the coating heat condition information of the optical fiber, the optical fiber coating removal device may receive the coating heat condition information transmitted from the fusion splicer as the optical fiber type information, and the heater may heat a coating of the optical fiber using the received coating heat condition information under a coating heat condition specified by the coating heat condition information.

A fifteenth aspect of one or more embodiments of the present invention provides an optical fiber coating removal system including an optical fiber coating removal device which heats a coating of an optical fiber with a heater and removes the coating with a blade, and an external device which inputs information used for heating a coating in the optical fiber coating removal device, in which the external device includes an inputter which inputs optical fiber type information to specify an optical fiber type selected by a user from among a plurality of optical fiber types, and a communicator which transmits information based on the input optical fiber type information, the optical fiber coating removal device includes a communicator which receives information based on the optical fiber type information transmitted from the external device, and a heater which heats a coating of an optical fiber using the received information based on the optical fiber type information, and the heater heats a coating under a plurality of conditions according to the optical fiber type information.

A sixteenth aspect of one or more embodiments of the present invention provides an optical fiber coating removal method using an optical fiber coating removal device which heats a coating of an optical fiber with a heater and removes the coating with a blade, and an external device which inputs information used for heating a coating in the optical fiber coating removal device, including an input step for inputting optical fiber type information to specify an optical fiber type selected by a user from among a plurality of optical fiber types, executed by the external device, a first communication step for transmitting information based on the input optical fiber type information, a second communication step for receiving information based on the optical fiber type information transmitted from the external device, executed by the optical fiber coating removal device, and a coating heat step for heating a coating of an optical fiber with the heater using the received information based on the optical fiber type information, in which the heater can heat a coating under a plurality of conditions according to the optical fiber type information in the coating heat step.

The above aspects of one or more embodiments of the present invention can provide an optical fiber coating removal device, an external device, an optical fiber coating removal system, and an optical fiber coating removal method, capable of making an operation of changing a setting of a coating heat condition easier.

BRIEF DESCRIPTION OF THE DRAWINGS

FIG. 5 is a diagram illustrating data of a plurality of connection programs stored in a fusion coating device.

FIG. 12 is a diagram illustrating data of a connection program stored in a fusion coating device when the procedure illustrated in FIG. 11 is executed.

FIG. 13 is a diagram illustrating data of heat temperature and heat time corresponding to coating information stored in an optical fiber coating removal device when the procedure illustrated in FIG. 11 is executed.

FIG. 25 is a diagram illustrating data of a plurality of heat recipes stored in the mobile terminal.

DETAILED DESCRIPTION

First Example

Hereinafter, an optical fiber coating removal system according to a first example of the present invention is described with reference to the drawings.

Figure 1:
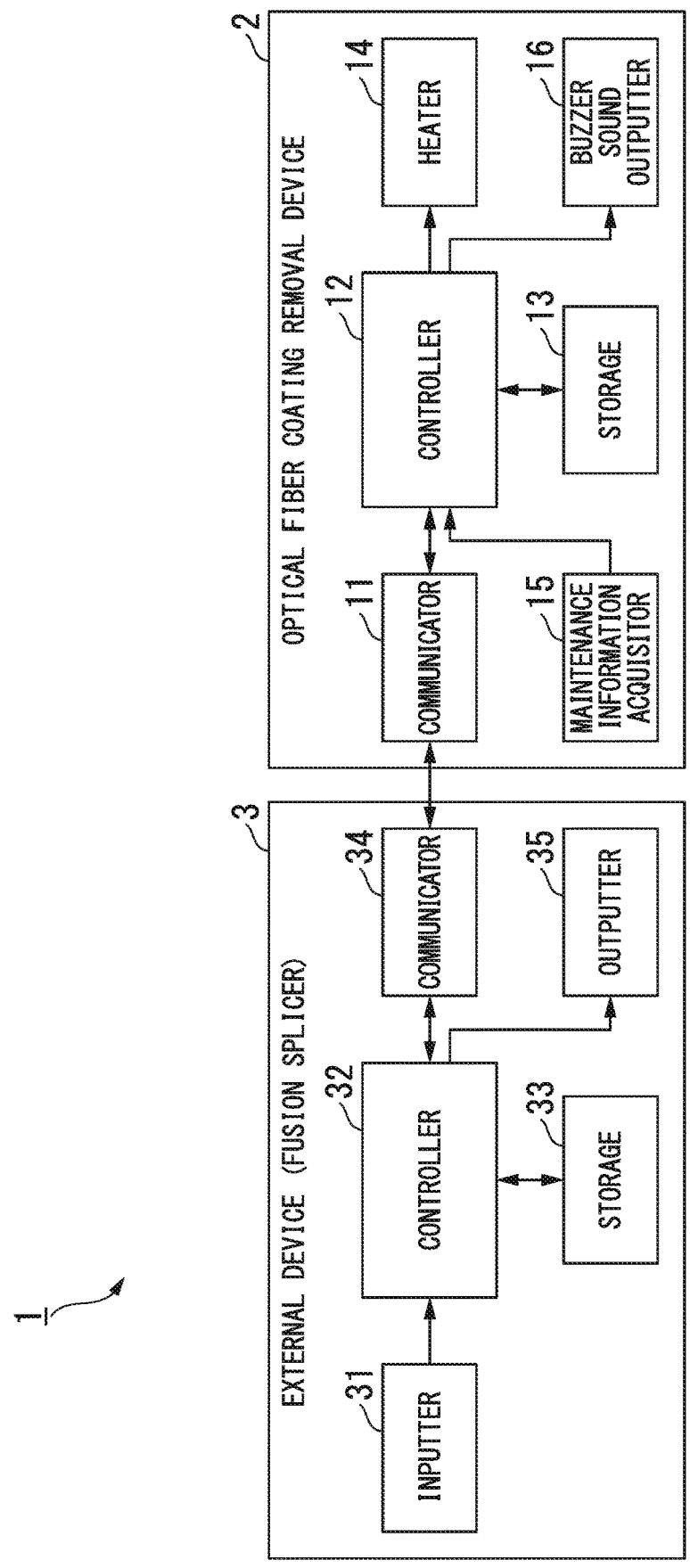
FIG. 1 is a block diagram illustrating an optical fiber coating removal system including an optical fiber coating removal device according to a first example of the present invention.
Figure 2:
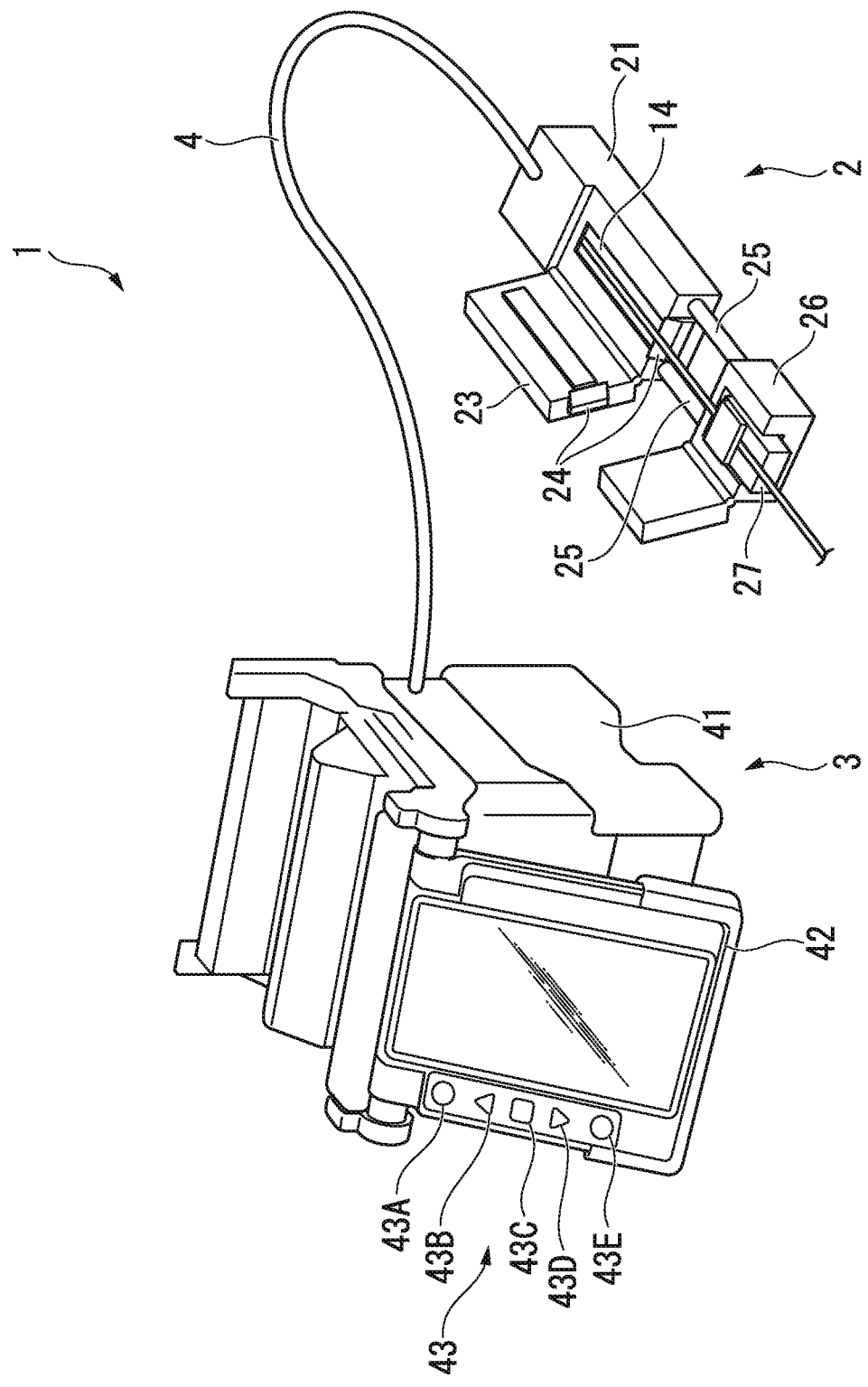
FIG. 2 is a perspective view of the optical fiber coating removal system according to the first example.

As illustrated in FIGS. 1 and 2, an optical fiber coating removal system 1 of one or more embodiments includes an optical fiber coating removal device 2 (hereinafter, abbreviated as a coating removal device 2) and an external device 3.

As illustrated in FIG. 1, the coating removal device 2 includes a communicator 11, a controller 12, a storage 13, a heater 14, a maintenance information acquisitor 15, and a buzzer sound outputter 16. The external device 3 is an optical fiber fusion splicer (hereinafter, abbreviated as a fusion splicer) which fusion-splices optical fibers from which a coating at an end portion has been removed to each other. Hereinafter, one or more embodiments are described by assuming that the external device 3 is a fusion splicer 3. The fusion splicer 3 includes an inputter 31, a controller 32, a storage 33, a communicator 34, and an outputter 35.

Here, the structure of the optical fiber coating removal system 1 (coating removal device 2 and fusion splicer 3) is described. As illustrated in FIG. 2, the coating removal device 2 includes a base 21. All of the communicator 11, the controller 12, the storage 13, the heater 14, and the maintenance information acquisitor 15 illustrated in FIG. 1 are housed in the base 21. Although not illustrated in FIG. 2, the buzzer sound outputter 16 is disposed on a surface of the base 21. Furthermore, although not illustrated, an LED lamp that lights up or flashes when a buzzer sound is generated is disposed on the surface of the base 21, and a built-in battery is housed in the base 21.

A heater 14 is formed in the base 21, and a lid member 23 is disposed on a side of the heater 14. An edge side of the lid member 23 is connected to the base 21, and the lid member 23 can be opened or closed by rotating about the edge side. By closing the lid member 23, an optical fiber placed on the heater 14 can be sandwiched between the heater 14 and the lid member 23.

Incidentally, in one or more embodiments, a heater for heating a coating is disposed only in the base 21. However, for example, a heater for heating a coating can be disposed not only in the base 21 but also in the lid member 23.

A coating removal blade 24 is disposed on a front end portion of each of the heater 14 and the lid member 23 in the base 21. By closing the lid member 23, the coating removal blades 24 can be put in a coating of an optical fiber sandwiched between the heater 14 and the lid member 23.

A clamp portion 26 movable in a direction toward or away from the base 21 while being guided by a slide shaft 25 is attached in the front of the base 21. The clamp portion 26 can clamp a fiber holder 27 that holds an optical fiber.

When a coating of an optical fiber is removed, the coating removal blade 24 is put in the coating of the optical fiber, and the coating at an end portion to be removed is heated and softened by the heater 14. Furthermore, by operating the clamp portion 26 and separating a main body portion of the optical fiber (portion other than the end portion of the optical fiber) clamped by the clamp portion 26 from the base 21, the coating at the end portion of the optical fiber is removed. Note that a procedure for removing a coating of an optical fiber is described in detail later. A coating heat condition upon removing a coating of a optical fiber is further described in detail later.

The fusion splicer 3 includes a fusion splice portion main body 41 and a display monitor 42. A fusion splice portion (not illustrated) which fusion-splices optical fibers to each other is disposed in the fusion splice portion main body 41. In addition, the fusion splice portion main body 41 houses the inputter 31, the controller 32, the storage 33, the communicator 34, a built-in battery (not illustrated), and the like illustrated in FIG. 1. The display monitor 42 is, for example, a liquid crystal monitor, and a display screen of the display monitor 42 is the outputter 35. Note that the display monitor 42 may be a display or the like other than a liquid crystal monitor.

On a side of the display monitor 42, an input key 43 is disposed. The input key 43 includes an escape key 43A, an up key 43B, a menu key 43C, a down key 43D, and an enter key 43E. The escape key 43A and the menu key 43C are keys which determine contents displayed on the display screen of the display monitor 42. The up key 43B and the down key 43D are keys which move a cursor displayed on the display screen of the display monitor 42 up and down, respectively. The enter key 43E is a key which determines various parameters such as a connection program or preheat temperature described later, changes setting of a coating heat condition, and the like. Various kinds of information corresponding to an operation of the input key 43 is input to the inputter 31, and the inputter 31 outputs the information to the controller 32.

In the above example, the coating removal device 2 is electrically connected to the fusion splicer 3 via a power cord 4. The fusion splicer 3 supplies power to the coating removal device 2 via the power cord 4. Therefore, the coating removal device 2 is charged by the fusion splicer 3. A communication signal can be superimposed on the power cord 4. Various kinds of information is exchanged between the coating removal device 2 and the fusion splicer 3 via the power cord 4.

The communicator 11 in the coating removal device 2 illustrated in FIG. 1 is connected to the power cord 4 and the controller 12. The communicator 11 receives and acquires information transmitted from the communicator 34 of the fusion splicer 3 via the power cord 4, and outputs the information to the controller 12. The communicator 11 transmits various kinds of information output from the controller 12 to the communicator 34 of the fusion splicer 3 via the power cord 4. The information transmitted from the communicator 34 of the fusion splicer 3 includes, for example, optical fiber type information to specify an optical fiber type selected by a user from among a plurality of optical fiber types described later. The communicator 11 receives coating heat condition information as information based on the optical fiber type information transmitted from the fusion splicer 3.

The controller 12 performs control based on various arithmetic processes and the like based on various kinds of information output from the communicator 11 or the maintenance information acquisitor 15 and various kinds of information stored in the storage 13. For example, the controller 12 controls at least one of heat temperature and heat time of the heater 14 based on a set coating heat condition stored in the storage 13, or stores a coating heat condition included in acquired information based on the optical fiber type information transmitted from the fusion splicer 3 in the storage 13 when the communicator 11 acquires the information. In addition, in a case where a set coating heat condition has been already stored in the storage 13, when the communicator 11 further acquires information transmitted from the fusion splicer 3 and newly sets a set coating heat condition, the controller 12 rewrites the set coating heat condition that has been already stored in the storage 13 to change the set coating heat condition. Furthermore, the controller 12 outputs various kinds of information to the communicator 11, the storage 13, the heater 14, and the buzzer sound outputter 16, and performs various controls.

The storage 13 stores "coating removal information," i.e., various kinds of information necessary for removing a coating of an optical fiber in the coating removal device 2. The storage 13 stores various kinds of information obtained by the controller 12. The controller 12 writes and stores various kinds of information in the storage 13 as necessary, or reads various kinds of information stored in the storage 13.

The heater 14 heats a coating of an optical fiber, for example, using a set coating heat condition stored in the storage 13 and read by the controller 12. In addition, the heater 14 can heat a coating under a plurality of conditions according to information based on optical fiber type information to specify an optical fiber type selected by a user (operator) from among a plurality of optical fiber types. Furthermore, the heater 14 uses the information based on the optical fiber type information, and therefore can heat a coating under a plurality of conditions according to the optical fiber type information. The controller 12 can set a plurality of coating heat conditions as set coating heat conditions according to information based on optical fiber type information transmitted from the fusion splicer 3. Note that in the following description, the coating heat temperature and the coating heat time under a set coating heat condition are referred to as set coating heat temperature and set coating heat time, respectively.

The maintenance information acquisitor 15 acquires maintenance information such as a capacity of a built-in battery, the number of times of charging and discharging the built-in battery, the number of times of use of the coating removal blade 24, or occurrence of abnormality. The maintenance information acquisitor 15 outputs the acquired maintenance information to the controller 12. The maintenance information acquisitor 15 only needs to be able to acquire at least one or more of a capacity of a built-in battery, the number of times of charging and discharging the built-in battery, the number of times of use of the coating removal blade 24, and occurrence of abnormality, serving as maintenance information. The controller 12 outputs information based on the output maintenance information to the communicator 11, and the communicator 11 transmits information based on the maintenance information acquired by the maintenance information acquisitor 15 to the fusion splicer 3. The storage 13 stores an ID number which is identification information of the coating removal device 2. When outputting maintenance information to the communicator 11, the controller 12 reads identification information stored in the storage 13, and outputs the identification information to the communicator 11 together with the maintenance information. The communicator 11 transmits information based on the identification information to the fusion splicer 3 together with information based on the maintenance information.

The communicator 11 receives information based on a buzzer sound volume-setting instruction for the coating removal device 2, transmitted from the fusion splicer 3. When a buzzer sound generation condition described later is satisfied, the buzzer sound outputter 16 outputs a buzzer sound using buzzer sound volume information which is information based on the buzzer sound volume-setting instruction output from the controller 12. The buzzer sound outputter 16 can output a buzzer sound with a plurality of buzzer sound volumes corresponding to the buzzer sound volume information.

The inputter 31 of the fusion splicer 3 inputs various kinds of information according to an operation of the input key 43 and the like. The inputter 31 outputs input various kinds of information to the controller 32.

The controller 32 performs various setting processes and the like based on various kinds of information input from the inputter 31 and various kinds of information transmitted from the communicator 11 of the coating removal device 2 via the power cord 4 and output from the communicator 34 of the fusion splicer 3. The controller 32 outputs various kinds of information to the storage 33, the communicator 34, the outputter 35, and the like based on a result of the above setting processes and the like.

The storage 33 stores various kinds of information necessary for fusion splice of an optical fiber in the fusion splicer 3, such as a connection program described later, and various kinds of information necessary for removing a coating in the coating removal device 2. In addition, the controller 32 writes and stores various kinds of information in the storage 33 as necessary, and reads various kinds of information stored in the storage 33.

The fusion splicer 3 stores a plurality of connection programs corresponding to optical fiber types in the storage 33. For example, the plurality of connection programs includes optical fiber type information, and the optical fiber type information includes coating heat condition information. The controller 32 specifies a connection program (connection program selected) selected by an operator among the plurality of connection programs stored in the storage 33 using input to the inputter 31, controls a fusion splice portion (not illustrated), and performs fusion splicing using the connection program selected.

The communicator 34 is connected to the power cord 4 and the controller 32. The communicator 34 outputs various kinds of information transmitted from the communicator 11 of the coating removal device 2 to the controller 32 via the power cord 4. In addition, the communicator 34 transmits various kinds of information output from the controller 32 to the communicator 11 of the coating removal device 2 via the power cord 4. The outputter 35 displays and outputs various kinds of information such as a connection program or maintenance information based on information output from the controller 32. For example, the fusion splicer 3 receives information based on maintenance information transmitted from the communicator 11 of the coating removal device 2, and outputs maintenance information from the outputter 35. The outputter 35 is, for example, a display monitor 42 described later, and the maintenance information is output to the display monitor 42. The fusion splicer 3 outputs the maintenance information from the display monitor 42 using the received information based on the maintenance information. In addition, the fusion splicer 3 outputs identification information of the coating removal device 2 from the display monitor 42 using the received information based on the identification information.

In addition, the fusion splicer 3 operates by receiving power supply from a commercial AC power source. The coating removal device 2 operates by receiving power supply from the fusion splicer 3 via the power cord 4. The fusion splicer 3 can also operate using a built-in battery as a power source by switching the commercial AC power source to the built-in battery. The coating removal device 2 can also operate using a built-in battery as a power source by switching power supply from the fusion splicer 3 to the built-in battery.

When the power source is switched from a commercial AC power source to a built-in battery, the fusion splicer 3 performs a power-saving operation so as to reduce power consumption of the built-in battery. Specifically, when an operation is not performed for a certain period of time, for example, 30 seconds, the display monitor 42 is turned off.

When the power source of the fusion splicer 3 is switched from a commercial AC power source to a built-in battery, the coating removal device 2 also performs a power-saving operation. When the power source is switched from a commercial AC power source to a built-in battery and a power-saving mode is turned ON, the fusion splicer 3 transmits power-saving information to the coating removal device 2 as information based on a power-saving operation-setting instruction. The communicator 11 of the coating removal device 2 receives power-saving information transmitted from the fusion splicer 3. The communicator 11 outputs the received power-saving information to the controller 12. The controller 12 gives an instruction for setting a power-saving operation using the output power-saving information. In a normal state in which no instruction for setting a power-saving operation is given, the controller 12 preheats the heater 14 such that the heater 14 reaches a heat temperature in a short time when a coating of an optical fiber is removed. In a power-saving state in which an instruction for setting a power-saving operation is given, the controller 12 performs setting to stop preheating of the heater 14 when the coating removal device 2 is not operated for a certain period of time, for example, 10 minutes. The coating removal device 2 suppresses power consumption by stopping preheating of the heater 14. The heater 14 controls preheat of the heater 14 using the power-saving information received by the communicator 11.

A procedure for removing a coating of an optical fiber by the coating removal device 2 is described. When the coating removal device 2 removes a coating of an optical fiber, first, an operator brings the clamp portion 26 close to the base 21 and opens the lid member 23 disposed in the base 21. The operator places the fiber holder 27 on the clamp portion 26 so as to dispose an end portion of an optical fiber on the heater 14, and clamps the fiber holder 27 to the clamp portion 26.

Then, the operator closes the lid member 23, and sandwiches the optical fiber between the heater 14 and the lid member 23. By closing the lid member 23, the coating removal blade 24 enters the coating of the optical fiber. When a sensor (not illustrated) detects that the lid member 23 has been closed, the heater 14 starts heating a coating at an end portion of an optical fiber to be removed. Thereafter, the coating at the end portion of the optical fiber is heated at a heat temperature (set coating heat temperature) set by the controller 12 for heat time (set coating heat time) set by the controller 12. After the set coating heat time has elapsed, for example, a buzzer sound is output from the buzzer sound outputter 16, and the operator is notified that preparation for extracting the coating has been completed. Then, the operator moves the clamp portion 26 in a direction away from the base 21, and the heated and softened coating at the end portion of the optical fiber is extracted. In this way, the coating of the optical fiber is removed.

Figure 4:
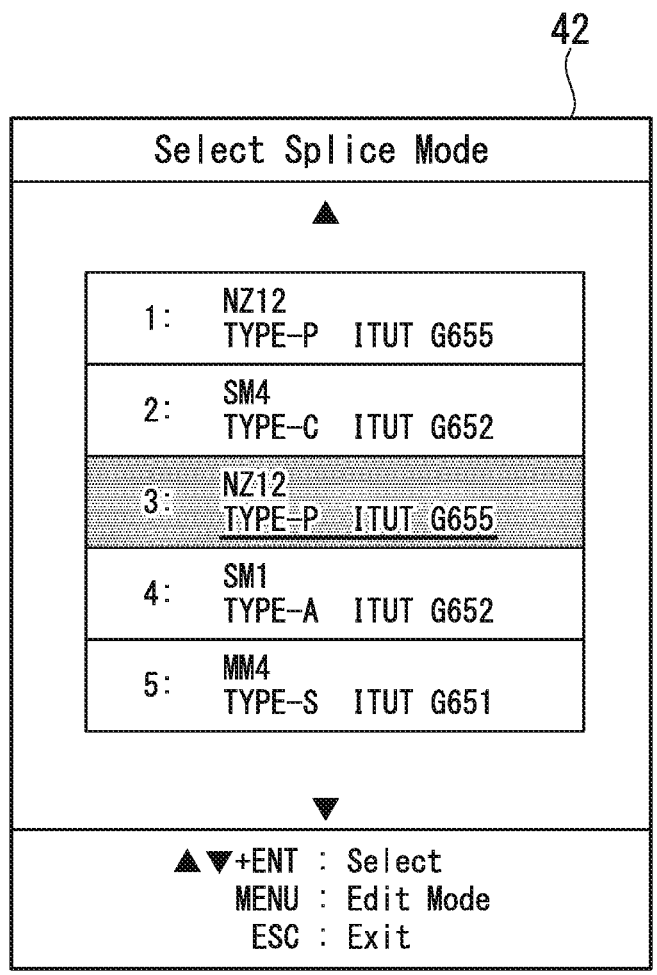
FIG. 4 is a diagram illustrating a display of a fusion splicer displaying connection program names of a plurality of connection programs.

Before the coating of the optical fiber is removed with the coating removal blade 24, it is necessary to heat the coating at coating heat temperature to make a coating extracting force small and/or for coating heat time to make a coating extracting force small. For example, it is necessary to heat the coating at optimum coating heat temperature to make a coating extracting force smallest (set coating heat temperature) and/or for optimum coating heat time to make a coating extracting force smallest (set coating heat time). The optimum coating heat temperature is illustrated in FIG. 4 of Japanese Unexamined Utility Model Application, First Publication No. H01-90003. The force of extracting an optical fiber from a coating at the time of removing the coating varies according to coating heat temperature. When the coating extracting force is high, a large tension is applied to the optical fiber at the time of removing the coating. During removal of the coating, the optical fiber is broken, or the strength of the optical fiber is lowered even if the optical fiber is not broken, and long-term reliability is reduced. Therefore, it is necessary to heat the coating at coating heat temperature to make a coating extracting force small.

In one or more embodiments, the coating heat temperature is selected to make a coating extracting force smallest.

Even if the coating is heated at the optimum coating heat temperature, it takes several seconds for the temperature to be transferred to an inside of the coating. If the coating is removed while heat is not transferred to the inside of the coating, the coating extracting force is large, and the optical fiber is broken during removal of the coating. Even if the optical fiber is not broken, the strength of the optical fiber is lowered, and long-term reliability is reduced.

Even if the coating is heated at the optimum coating heat temperature, when the heat time is longer than necessary, some coating materials are formed into powder due to heating for a long time, and the powder remains on a surface of the optical fiber after removal of the coating. Powder on a surface of an optical fiber glass, not removed by cleaning burns during fusion splice, and deteriorates the strength of the optical fiber.

Next, a coating heat condition for removing a coating of an optical fiber is described. When a coating of an optical fiber is removed, a coating heat condition-setting process for setting a coating heat condition for heat a coating of an optical fiber is performed. Hereinafter, a procedure of the coating heat condition-setting process is described with reference to FIG. 3.

Figure 3:
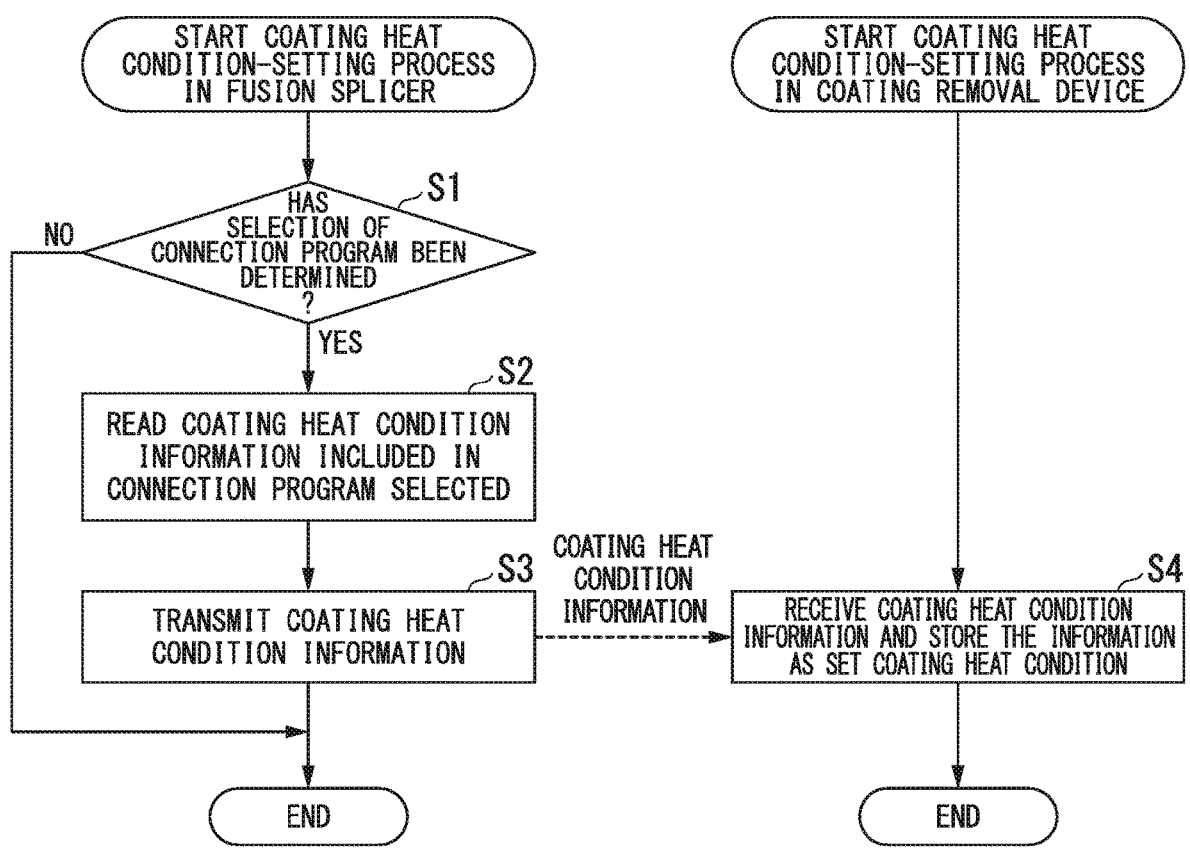
FIG. 3 is a flowchart illustrating a procedure of a coating heat condition-setting process.

As illustrated in FIG. 3, in the coating heat condition-setting process, the controller 32 determines whether selection of a connection program has been determined (step S1). As a result, when the selection of a connection program has not been determined (step S1; NO), the coating heat condition-setting process is terminated as it is.

A plurality of connection programs for fusion-splicing optical fibers to each other is stored in the storage 33 of the fusion splicer 3. A connection program number is assigned to each of the plurality of connection programs. When an operator selects a connection program, for example, as illustrated in FIG. 4, numbers (connection program numbers) and names (connection program names) of the plurality of connection programs are displayed on a display screen of the display monitor 42 of the fusion splicer 3. A connection program name includes information to specify an optical fiber to be fusion-spliced.

In the example illustrated in FIG. 4, five connection program numbers and connection program names are displayed.

The connection program name of a connection program number 1 is "NZ12 TYPE-P ITUTG655".

The connection program name of a connection program number 2 is "SM4 TYPE-C ITUTG652".

The connection program name of a connection program number 3 is "NZ12 TYPE-P ITUTG655".

The connection program name of a connection program number 4 is "SM1 TYPE-A ITUTG652".

The connection program name of a connection program number 5 is "MM4 TYPE-S ITUTG651".

In each connection program, the first character string represents a classification and the core number of an optical fiber, the second character string represents the type of an optical fiber, and the third character string represents the standard number of the international standard ITU-T. For example, in a connection program "NZ12 TYPE-P ITUTG655", "NZ12" represents an optical fiber (tape type optical fiber) with the core number of 12, classified into a non-zero dispersion shifted fiber. "TYPE-P" represents a specific type of the optical fiber. "ITUTG655" represents the standard number G.655 of the optical fiber in the international standard ITU-T.

For example, an operator can select and determine a connection program by operating the input key 43 illustrated in FIG. 2. In the example illustrated in FIG. 4, a connection program "NZ12 TYPE-P ITUTG655" where the cursor is located is selected. By operating the up key 43B or the down key 43D in the above state, the cursor moves up and down, and the selected connection program number is changed.

When the cursor is positioned at a desired connection program number, the operator operates the enter key 43E. By operating the enter key 43E, the selection of a connection program where the cursor is located is determined. The inputter 31 inputs a series of input information to the input key 43 up to that point as optical fiber type information selected by a user (operator) from among a plurality of optical fiber types, and outputs the information to the controller 32. Note that the optical fiber type information is information to specify an optical fiber type. In one or more embodiments, the optical fiber type information includes coating heat condition information. The controller 32 specifies an optical fiber type based on the optical fiber type information. For example, when the enter key 43E is operated in the state illustrated in FIG. 4, the controller 32 specifies an optical fiber type included in a connection program "NZ12 TYPE-P ITUTG655". The fusion splicer 3 selects a connection program including an optical fiber type, and specifies the connection program as a determined connection program.

When selection of a connection program has been determined in step S1 (step S1; YES), the controller 32 reads coating heat condition information included in a connection program selected from the storage 33 (step S2). A connection program stored in the storage 33 includes a plurality of items for fusion-splicing optical fibers to each other.

Specifically, as illustrated in FIG. 5, a connection program includes items such as a discharge heat current for fusion-splicing optical fibers to each other, discharge heat time, and an optical fiber insertion amount in addition to a connection program number and a connection program name. In a connection program, a value of each of the items "a discharge heat current", "discharge heat time", and "an optical fiber insertion amount" included in the connection program is a value suitable for an optical fiber type corresponding to the connection program. The fusion splicer 3 fusion-splices optical fibers to each other with a fusion splice portion (not illustrated) using values of the above items. Information such as "a discharge heat current", "discharge heat time", or "an optical fiber insertion amount" included in a connection program is optical fiber type information to specify an optical fiber type.

Furthermore, an item of a connection program also includes a coating heat condition for heating and removing a coating of an optical fiber to be connected with the coating removal device 2. The coating heat conditions includes heat temperature and heat time of the heater 14 in the coating removal device 2. The controller 32 reads a coating heat condition included in a connection program selected from the storage 33. For example, a coating heat condition included in a connection program selected "NZ12 TYPE-P ITUTG655" is read from the storage 33 as information based on optical fiber type information.

Subsequently, the controller 32 transmits coating heat condition information corresponding to the read coating heat condition via the communicator 34 (step S3). The coating removal device 2 performs a process of waiting for transmission of coating heat condition information from the fusion splicer 3 when starting a coating heat condition-setting process. When the coating heat condition information is transmitted, the communicator 11 in the coating removal device 2 receives the coating heat condition information transmitted from the fusion splicer 3 and outputs the information to the controller 12. The controller 12 stores the coating heat condition information output from the communicator 11 in the storage 13 as a set coating heat condition (step S4). At this time, when the set coating heat condition is already stored in the storage 13, a new set coating heat condition is overwritten on the stored set coating heat condition, and setting of the set coating heat condition is changed. In this way, the coating heat condition-setting process is terminated.

In a case where the coating removal device 2 removes a coating of an optical fiber after the coating heat condition-setting process is terminated, when the lid member 23 is closed and heat of the coating of the optical fiber is started by the heater 14, the coating removal device 2 performs a coating heat process. Hereinafter, a procedure of the coating heat process is described with reference to FIG. 6.

Figures 6, 7:
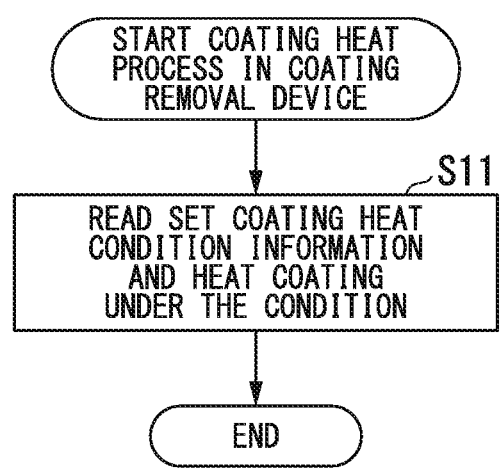
FIG. 6 is a flowchart illustrating a procedure of a coating heat process.
FIG. 7 is a diagram illustrating data of a set coating heat condition stored in an optical fiber coating removal device.

As illustrated in FIG. 6, when the coating removal device 2 starts the coating heat process, the controller 12 reads a set coating heat condition stored in the storage 13, and heats a coating with the heater 14 under the read set coating heat condition (Step S11). In this way, the heater 14 heats a coating of an optical fiber using the set coating heat condition information. As illustrated in FIG. 7, the set coating heat condition information includes coating heat temperature and coating heat time (set coating heat temperature and set coating heat time). The controller 12 heats a coating under the read set coating heat condition, in this case, at T3° C. for t3 seconds. In this way, the coating heat process is terminated.

Figure 8A:
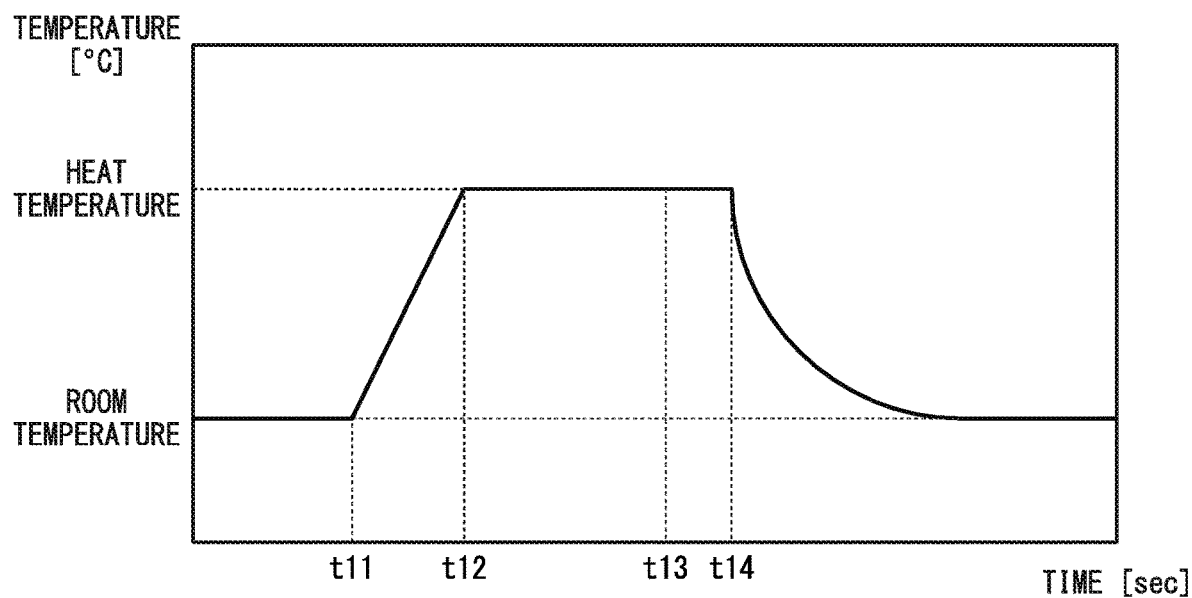
FIG. 8A is a time chart illustrating a change in the temperature of a heater at the time of executing the coating heat process, and illustrates a case where a power-saving operation is performed.

Here, a change in the temperature of the heater 14 when the coating heat process is performed is described. FIG. 8A illustrates a change in the temperature of the heater when a coating heat process is performed while a power-saving operation is performed and preheating of the heater 14 is stopped. As illustrated in FIG. 8A, while a power-saving operation is performed, the heater 14 is kept at room temperature until the coating heat process is started. When an operator closes the lid member 23 at the time of t11 seconds, the controller 12 controls the heater 14 to start the coating heat process.

The temperature of the heater 14 is raised by heating. When the time elapses and the temperature of the heater 14 reaches a set coating heat temperature at the time of t12 seconds, the controller 12 starts a constant temperature control of the heater 14 and maintains the temperature of the heater 14 at the set coating heat temperature. The controller 12 starts measuring the set coating heat time from the time of t12 seconds when the temperature of the heater 14 reaches the set coating heat temperature.

When the set coating heat time elapses and the time of t13 seconds has elapsed, the controller 12 causes the buzzer sound outputter 16 to output a buzzer sound to notify elapse of the set coating heat time. The time of t13 seconds is optimum timing for removing a coating. At this timing, for example, the LED lamp may be controlled to light up or flash. An operator who has noticed these signs moves the clamp portion 26 in a direction away from the base 21, and a heated and softened coating at an end portion of an optical fiber is thereby extracted. In this way, a coating of an optical fiber is removed. It is assumed that an operator opens the lid member 23 in order to take out an optical fiber from which a coating has been removed at the time of t14 seconds. For example, when a sensor (not illustrated) detects opening of the lid member 23, the controller 12 terminates heating of the heater 14. The controller 12 terminates heating of the heater 14, and the coating heat process is thereby terminated. Thereafter, the temperature of the heater 14 is gradually lowered to room temperature.

In this way, the coating heat process under the set coating heat condition is performed. Incidentally, in one or more embodiments, it is defined that measurement of the coating heat time is started from the time when the temperature of the heater 14 reaches the set coating heat temperature (coating heat time=t13 seconds−t12 seconds). However, it may be defined that measurement of the coating heat time is started from the time when heating of the heater 14 is started (coating heat time=t13 seconds−t11 seconds). The starting point of the set coating heat time may be arrival time of the set coating heat temperature of the heater 14 or may be the heating start time of the heater 14.

Next, a first modified example of the coating heat condition-setting process is described. A coating heat condition-setting process of the first modified example is different from the above embodiments mainly in information stored in each of the storage 13 of the coating removal device 2 and the storage 33 of the fusion splicer 3 and control of the controller 12 of the coating removal device 2 and the controller 32 of the fusion splicer 3. Hereinafter, the first modified example is described focusing on a difference from the above embodiments.

In the first modified example, a connection program number is transmitted from the fusion splicer 3 to the coating removal device 2 as information based on optical fiber type information. The connection program number is selected by selection of a connection program by an operator in the fusion splicer 3. The controller 12 of the coating removal device 2 specifies a coating heat condition using the transmitted connection program number. The storage 13 stores information of the specified coating heat condition as set coating heat condition information. The heater 14 reads the specified coating heat condition using the connection program number, and heats a coating of an optical fiber under the read coating heat condition. In this way, the heater 14 heats a coating of an optical fiber using the received connection program number. Hereinafter, the coating heat condition-setting process in the first modified example is described.

Figures 9, 10:
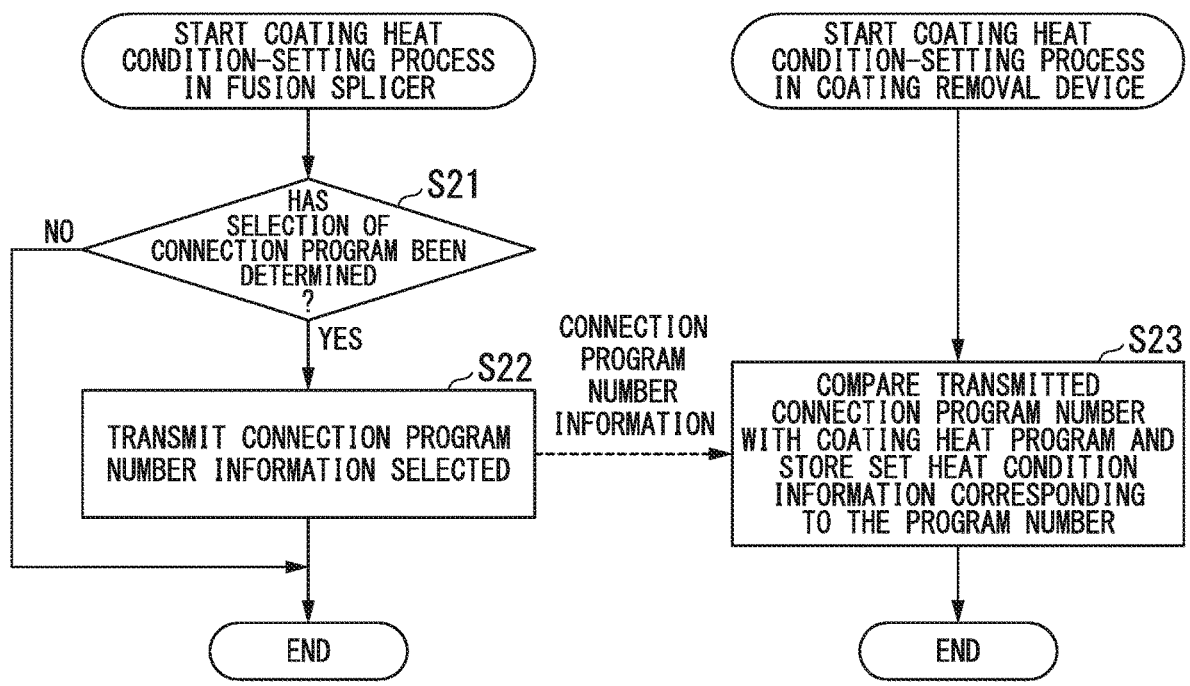
FIG. 9 is a flowchart illustrating a first modified example of the procedure of the coating heat condition-setting process.
FIG. 10 is a diagram illustrating data of heat temperature and heat time corresponding to a connection program number stored in an optical fiber coating removal device when the procedure illustrated in FIG. 9 is executed.

In the coating heat condition-setting process in the first modified example, as illustrated in FIG. 9, the controller 32 determines whether selection of a connection program has been determined (step S21). The above determination is performed in a similar manner to step S1 (see FIG. 3) of the above embodiments. As a result, when selection of a connection program has not been determined (step S21; NO), the coating heat condition-setting process is terminated as it is.

When selection of a connection program has been determined (step S21; YES), the controller 32 transmits a connection program number selected to the coating removal device 2 via the communicator 34 (step S22). The coating removal device 2 performs a process of waiting for transmission of a connection program number from the fusion splicer 3 when starting a coating heat condition-setting process. When a connection program number is transmitted, the controller 12 of the coating removal device 2 compares the connection program number transmitted from the fusion splicer 3 via the communicator 11 with a coating heat program stored in the storage 13, and controls such that a coating heat condition included in a coating heat program corresponding to the connection program number as a set coating heat condition (step S23) is stored.

The storage 13 of the coating removal device 2 in the first modified example stores the coating heat program illustrated in FIG. 10. The coating heat program includes coating heat temperature and coating heat time corresponding to a connection program of the fusion splicer 3. More specifically, the coating heat program includes coating heat temperature and coating heat time included in a connection program with a connection program number common with a coating heat program number. Incidentally, the connection program stored in the storage 33 of the fusion splicer 3 in the first modified example may be the connection program illustrated in FIG. 5, or may be a connection program obtained by eliminating coating heat temperature and coating heat time from the items of the connection program illustrated in FIG. 5.

The controller 12 can read a coating heat condition from the transmitted connection program number. Specifically, when a connection program number 3 is transmitted, the controller 12 compares the connection program number 3 with a coating heat program, and reads coating heat temperature T3 and coating heat time t3 which are coating heat conditions included in a coating heat program 3 corresponding to the connection program number 3. Then, the controller 12 stores the read coating heat temperature T3 and coating heat time t3 in the storage 13 as a set coating heat condition. In this way, the coating heat condition-setting process is terminated.

Incidentally, in the coating heat condition-setting process in the first modified example, the connection program number is transmitted from the fusion splicer 3 to the coating removal device 2. However, for example, a coating heat program number may be transmitted. In this case, in the items of the connection program (see FIG. 5) in the above embodiments, an item of a connection program number may be provided in place of the items of "coating heat condition" and "coating heat time", and a heat program number included in a connection program selected and determined may be transmitted to the coating removal device 2.

Subsequently, a second modified example of the coating heat condition-setting process is described. Similarly to the first modified example, the coating heat condition-setting process of the second modified example is different from the above embodiments in information stored in each of the storage 13 of the coating removal device 2 and the storage 33 of the fusion splicer 3 and control of the controller 12 of the coating removal device 2 and the controller 32 of the fusion splicer 3. Hereinafter, the second modified example is described focusing on a difference from the above embodiments.

In the second modified example, coating information is transmitted from the fusion splicer 3 to the coating removal device 2 as information based on optical fiber type information. The coating information is selected by selection of a connection program by an operator in the fusion splicer 3. The controller 12 of the coating removal device 2 specifies a coating heat condition using the transmitted coating information. The storage 13 stores information of the specified coating heat condition as set coating heat condition information. The heater 14 reads the specified coating heat condition using a connection program number, and heats a coating of an optical fiber under the read coating heat condition. In this way, the heater 14 heats a coating of an optical fiber using the received coating information. Hereinafter, the coating heat condition-setting process in the second modified example is described.

Figure 11:
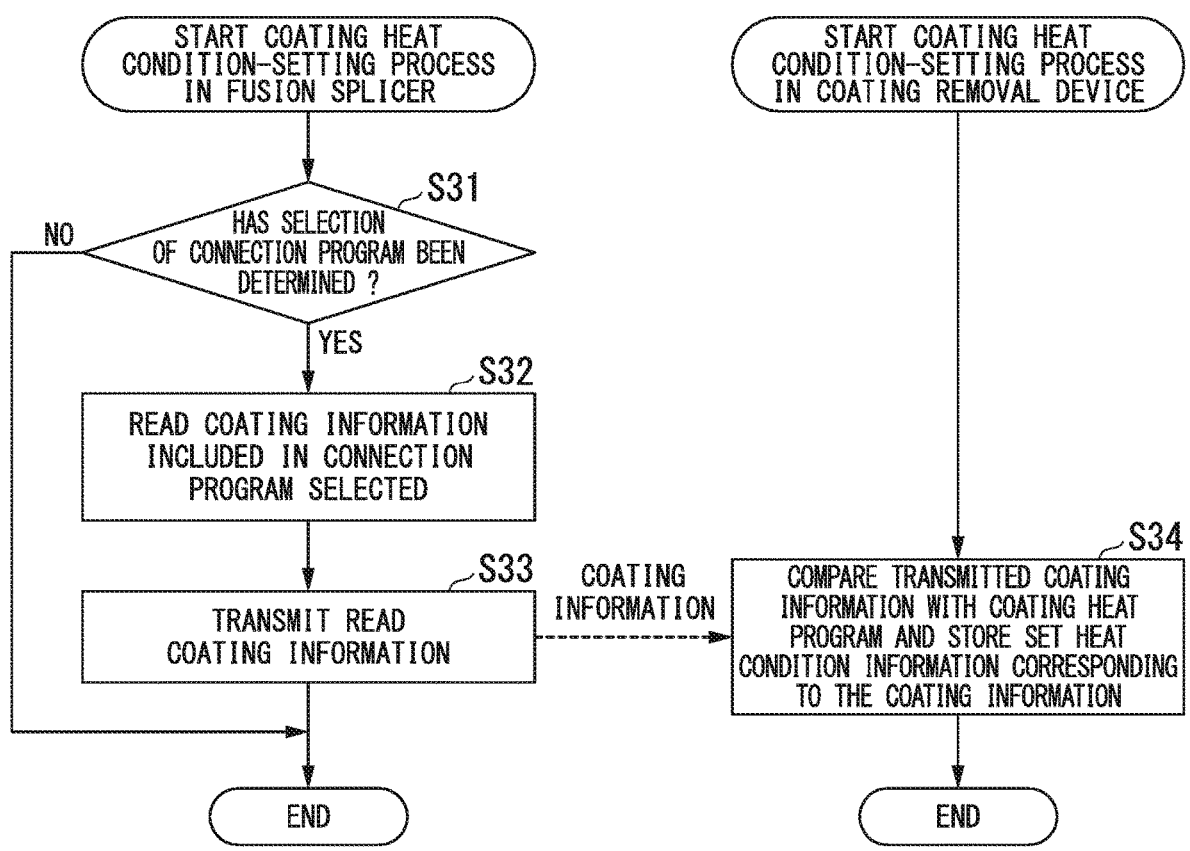
FIG. 11 is a flowchart illustrating a second modified example of the procedure of the coating heat condition-setting process.

In the coating heat condition-setting process in the second modified example, as illustrated in FIG. 11, the controller 32 determines whether selection of a connection program has been determined (step S31). The determination is made in a similar manner to the above embodiments. As a result, when selection of a connection program has not been determined (step S31; NO), the controller 32 terminates the coating heat condition-setting process as it is.

When selection of a connection program has been determined (step S31; YES), the controller 32 reads coating information included in a connection program selected (step S32). In the second modified example, as illustrated in FIG. 12, the plurality of connection programs stored in the storage 33 includes items serving as coating information, such as the core number of an optical fiber, a coating diameter, and a coating material in addition to items such as a connection program number, a connection program name, a discharge heat current for connecting optical fibers to each other, discharge heat time, and an optical fiber insertion amount, similar to those in the above embodiments. The controller 32 reads the core number of an optical fiber, a coating diameter, and a coating material serving as coating information corresponding to a determined connection program from the storage 33.

Subsequently, the controller 32 transmits the read coating information to the coating removal device 2 via the communicator 34 (step S33). The coating removal device 2 performs a process of waiting for transmission of coating information from the fusion splicer 3 when starting a coating heat condition-setting process. When coating information is transmitted, the controller 12 of the coating removal device 2 compares the coating information transmitted from the fusion splicer 3 via the communicator 11 with a coating heat program stored in the storage 13, and controls such that a coating heat condition included in a coating heat program including the transmitted coating information as a set coating heat condition (step S34) is stored.

The storage 13 of the coating removal device 2 in the second modified example stores the coating heat program illustrated in FIG. 13. The coating heat program includes coating information included in a connection program having a connection program number common with a coating heat program number among connection programs stored in the storage 33 of the fusion splicer 3. Specifically, a connection program of a connection program number 1 illustrated in FIG. 12 includes the core number Na, a coating diameter Ra, and a coating material OO as coating information. In addition, a coating heat program of a coating heat program number 1 illustrated in FIG. 13 also includes the core number Na, a coating diameter Ra, and a coating material OO as coating information.

The controller 12 can specify a coating heat program from the transmitted coating information and can read a coating heat condition included in the specified coating heat program. Specifically, when coating information stored in a connection program of a connection program number 3 is transmitted, the controller 12 compares the transmitted coating information with a coating heat program, specifies a coating heat program number 3, and reads coating heat temperature T3 and coating heat time t3 which are coating heat conditions included in a coating heat program of the coating heat program number 3. Then, the controller 12 stores the read coating heat temperature T3 and coating heat time t3 in the storage 13 as a set coating heat condition. In this way, the coating heat condition-setting process is terminated.

In addition to the coating heat condition-setting process, the optical fiber coating removal system 1 performs various processes such as a power-saving process, a maintenance information acquisition display process, a buzzer sound volume-setting process, and a buzzer sound output process. Each of these processes is described below.

Figure 14:
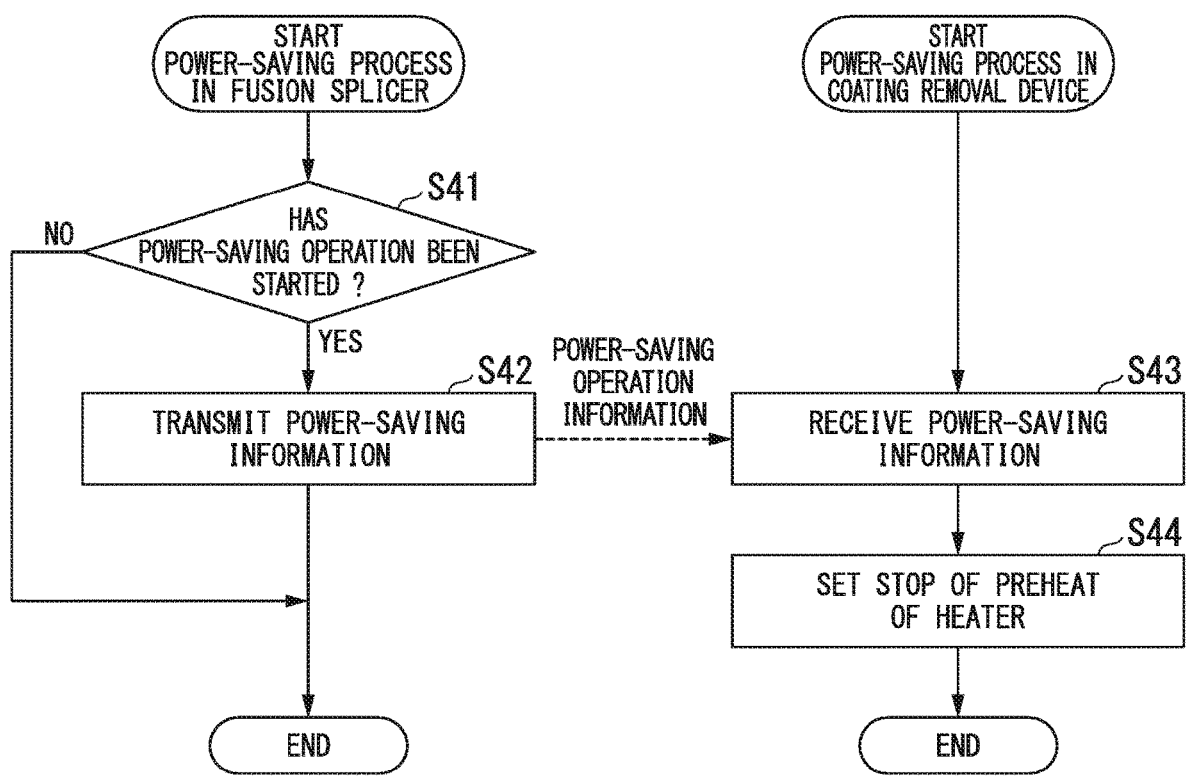
FIG. 14 is a flowchart illustrating a procedure of a power-saving process.

The power-saving process is performed according to the flowchart illustrated in FIG. 14. When the fusion splicer 3 starts a power-saving process, the controller 32 determines whether a power-saving operation is performed (step S41). Whether the power-saving operation is performed is determined by whether the power source is switched from a commercial AC power source to a built-in battery. As a result, when the power-saving operation is not performed (step S41; NO), the controller 32 terminates the power-saving start process as it is because of being in a normal state.

When the power-saving operation is performed (step S41; YES), the controller 32 transmits power-saving information to the coating removal device 2 via the communicator 34 (step S42). The coating removal device 2 performs a process of waiting for transmission of power-saving information from the fusion splicer 3 when starting a power-saving process. When the power-saving information is transmitted, the controller 12 of the coating removal device 2 receives the power-saving information transmitted from the fusion splicer 3 via the communicator 11 (step S43), and sets stop of preheating of the heater 14 as a power-saving operation (step S44). In this way, the heater 14 controls preheating of the heater 14 using the power-saving information. In this way, the power-saving process is terminated.

Figure 15:
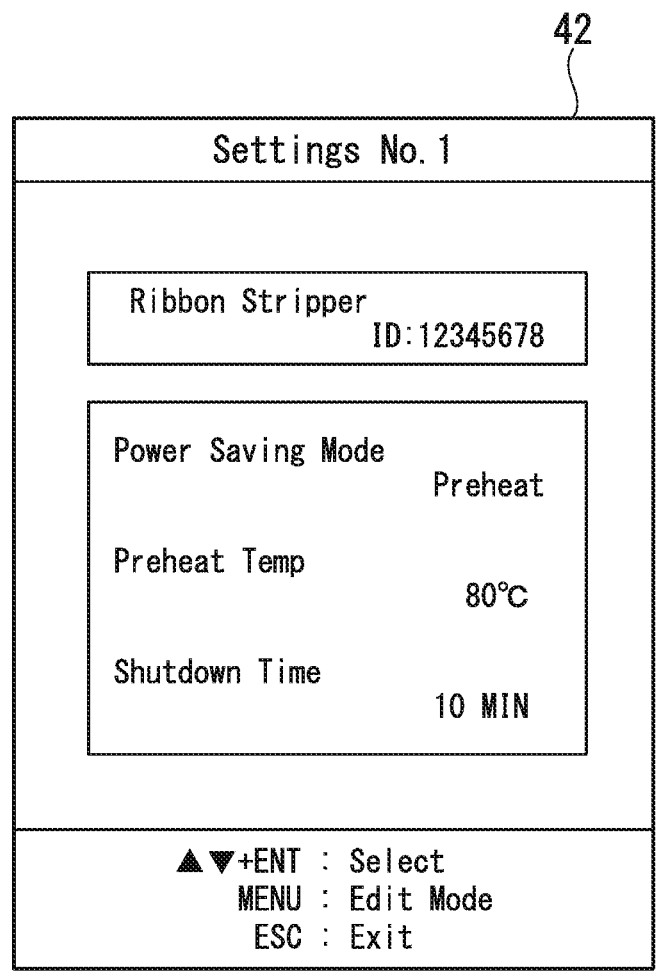
FIG. 15 is a diagram illustrating a power-saving setting screen displayed on a display of the fusion splicer.

Setting of the power-saving information in a power operation can be performed by displaying the power-saving setting screen illustrated in FIG. 15, displayed on the display monitor 42 of the fusion splicer 3. The power-saving setting screen illustrated in FIG. 15 can be displayed by operation of the input key 43 in the fusion splicer 3 by an operator. In addition, by operation of the input key 43 in the fusion splicer 3, the power-saving setting screen illustrated in FIG. 15 can be displayed. As illustrated in FIG. 15, on the power-saving setting screen, information of an ID number (Ribbon Stripper ID) of the coating removal device 2 as identification information, a power-saving mode (Power-saving mode) as power-saving information, a preheat temperature (Preheat Temp), and shutdown time (Shutdown Time) is displayed.

Among these pieces of information, the power-saving mode is in a power-saving state (Power Saving) in which a power-saving operation is performed when being ON, and the power-saving mode is in a normal state (Preheat) in which preheating of the heater 14 is performed when being OFF. The preheat temperature is a temperature at which the heater 14 is preheated in a normal state in which the power-saving operation is not performed. The shutdown time is time until preheating is stopped when a non-operation state continues from the start of the power-saving operation.

In the example illustrated in FIG. 15, the power-saving mode is OFF in a normal state in which the power-saving operation is not performed, the preheat temperature is set to 80° C., and the shutdown time of the fusion splicer 3 is set to 10 minutes. When the power-saving setting screen is displayed, by operation of the input key 43, a power-saving operation-setting instruction to the coating removal device 2 for setting a power-saving mode as power-saving information, a preheat temperature, and shutdown time can be issued. Note that the ID number of the coating removal device 2 as identification information displays information transmitted from the coating removal device 2 to the fusion splicer 3 in the maintenance information acquisition display process described later.

When the fusion splicer 3 terminates the power-saving operation and is in a normal state, the controller 32 of the fusion splicer 3 transmits normal information to the controller 12 of the coating removal device 2. The controller 12 of the coating removal device 2 which has received the normal information terminates the power-saving operation and shifts to a normal state, and starts preheating of the heater 14 when preheating of the heater 14 is stopped.

Figure 8B:
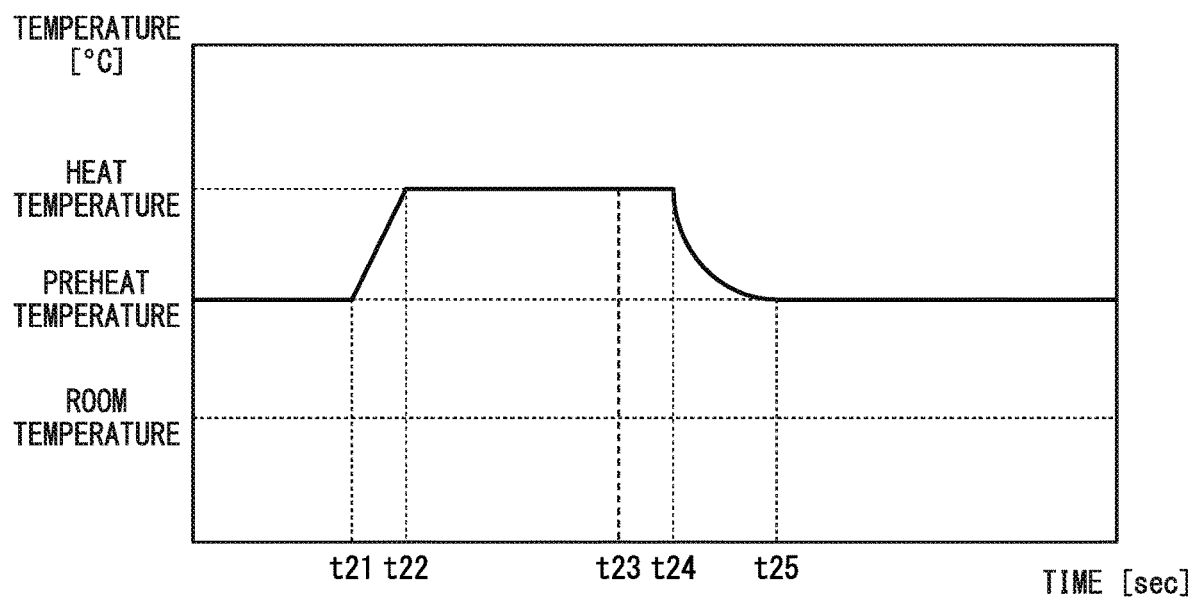
FIG. 8B is a time chart illustrating a change in the temperature of the heater at the time of executing the coating heat process, and illustrates a normal state where a power-saving operation is not performed.

A change in the temperature of the heater 14 is described in a normal state. FIG. 8B illustrates a change in the temperature of the heater when a coating heat process is performed while the heater 14 is preheated in a normal state. As illustrated in FIG. 8B, in a normal state, the controller 12 performs constant temperature control for maintaining the heater 14 at a preheat temperature. When an operator closes the lid member 23 at the time of t21 seconds, the controller 12 controls the heater 14 to start the coating heat process.

The temperature of the heater 14 is raised by heating. When the time elapses and the temperature of the heater 14 reaches a set coating heat temperature at the time of t22 seconds, the controller 12 starts a constant temperature control of the heater 14 and maintains the temperature of the heater 14 at the set coating heat temperature. The heater 14 is preheated in a normal state in which a power-saving operation is not performed. Therefore, the time for the temperature of the heater 14 to reach the set coating heat temperature is shorter than that in a case where the power-saving operation is performed. The controller 12 starts measuring the set coating heat time from the time of t22 seconds when the temperature of the heater 14 reaches the set coating heat temperature.

After elapse of the set coating heat time, the time of t23 seconds is optimum timing for removing a coating. At this time, the controller 12 may control the LED lamp to cause the LED lamp to light up or flash. An operator who has noticed these signs moves the clamp portion 26 in a direction away from the base 21, and a heated and softened coating at an end portion of an optical fiber is thereby extracted. In this way, the coating of the optical fiber is removed. When an operator opens the lid member 23 in order to take out an optical fiber from which a coating has been removed at the time of t24 seconds, the controller 12 terminates heating of the heater 14. The controller 12 terminates heating of the heater 14, and the coating heat process is thereby terminated. Thereafter, the temperature of the heater 14 is gradually lowered to a preheat temperature. When the temperature of the heater 14 reaches the preheat temperature at the time of t25 seconds, the controller 12 starts constant temperature control to maintain the heater 14 at the preheat temperature. In this way, the coating heat process at coating heat temperature and coating heat time under the set coating heat condition is performed. Note that as a definition of heat time, a certain period of time from start of heating of the heater 14 may be measured as the heat time (heat time=t23−t21) as in the power-saving mode.

Figure 16:
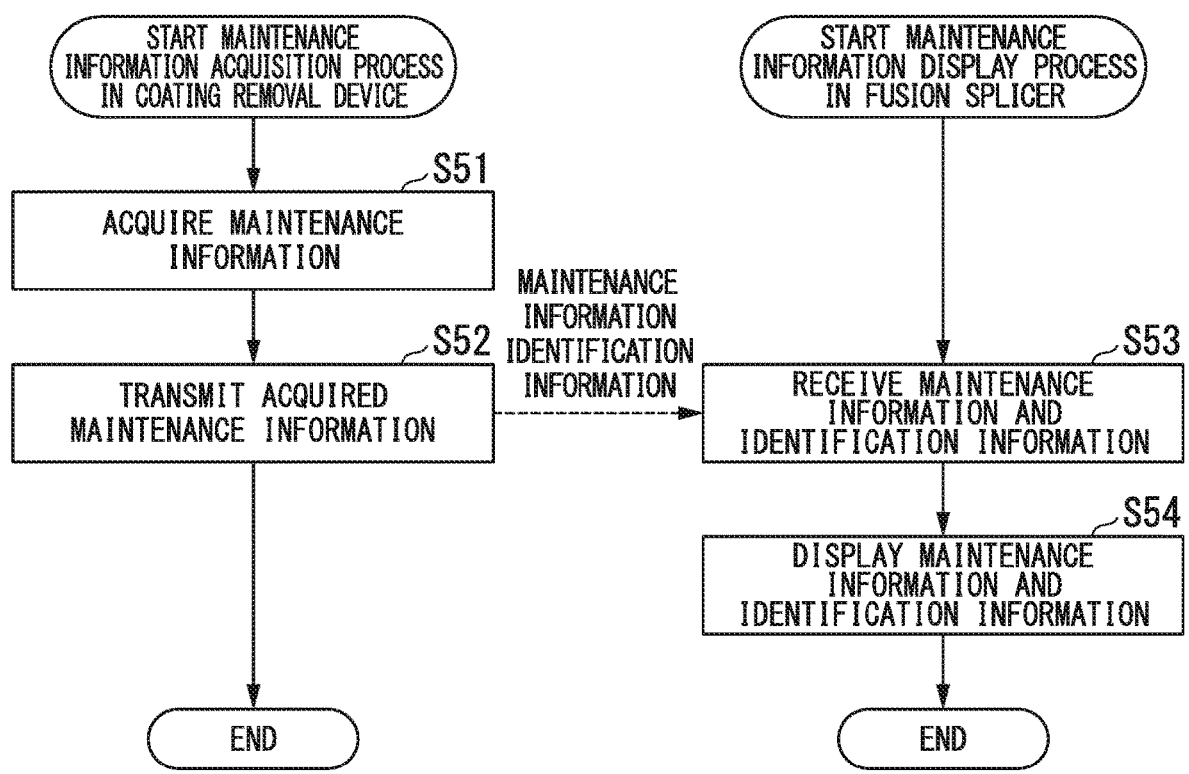
FIG. 16 is a flowchart illustrating a procedure of a maintenance information acquisition process.

The maintenance information acquisition display process is performed according to the flowchart illustrated in FIG. 16. As the maintenance information acquisition display process, the coating removal device 2 performs a maintenance information acquisition process, and the fusion splicer 3 performs a maintenance information display process. As illustrated in FIG. 16, when the coating removal device 2 starts a maintenance information acquisition process, the controller 12 of the coating removal device 2 acquires maintenance information of the coating removal device 2 in the maintenance information acquisitor 15 (step S51). The maintenance information includes the number of times of use of the coating removal blade 24, a capacity of a built-in battery built in the coating removal device 2, the number of times of charging and discharging the built-in battery, and occurrence of abnormality in the coating removal device 2.

The maintenance information acquisitor 15 includes a battery charge amount sensor, a counter for the number of times of charging and discharging a battery, a counter for the number of times of removing a coating, an abnormality detection sensor, and the like. The battery charge amount sensor detects and acquires a capacity of the built-in battery in the coating removal device 2. The counter for the number of times of charging and discharging a battery counts the number of times of charging and discharging the built-in battery in the coating removal device 2. As the number of times of charging and discharging the built-in battery in the coating removal device 2, the number of times of charging and the number of times of discharging are counted separately. However, the number of times of charge and discharge may be counted in total. Here, the number of times of charging the built-in battery is counted. The counter for the number of times of removing a coating counts the number of times of putting the coating removal blade 24 in a coating of an optical fiber, in other words, the number of times of use of the coating removal blade 24. When an abnormality such as overheating of the built-in battery or the heater 14, contamination of foreign matters (residue of coating scraps after extracting), or closure failure of the lid member 23 occurs in the coating removal device 2, the abnormality detection sensor detects these abnormalities. The maintenance information acquisitor 15 outputs the detected capacity of a built-in battery and occurrence of abnormality, and the counted number of times of charging and discharging the built-in battery and number of times of use of the coating removal blade 24 to the controller 12 as information based on the acquired maintenance information.

The controller 12 transmits information based on the maintenance information acquired by the maintenance information acquisitor 15 to the fusion splicer 3 via the communicator 11 (step S52). At this time, the controller 12 transmits information based on the identification information of the coating removal device 2 together (step S52). The controller 12 repeatedly performs a maintenance information acquisition start process at predetermined time intervals, for example, at intervals of 5 minutes from the time when the coating removal device 2 is connected to the fusion splicer 3. Information based on the identification information of the coating removal device 2 may be transmitted to the fusion splicer 3 only once when the coating removal device 2 is connected to the fusion splicer 3.

The fusion splicer 3 performs a process of waiting for transmission of information based on the maintenance information and information based on the identification information from the coating removal device 2 when starting a maintenance information display process. When the information based on the maintenance information and the information based on the identification information are transmitted, the controller 32 of the fusion splicer 3 receives the information based on the maintenance information and the information based on the identification information transmitted from the coating removal device 2 via the communicator 34 (step S53), and displays the maintenance information and the identification information on the display monitor 42 using the received information based on the maintenance information and the received information based on the identification information (step S54). In this way, the controller 32 outputs the maintenance information and the identification information to the display monitor 42 using the received information based on the maintenance information and the received information based on the identification information. In this way, the maintenance information acquisition display process is terminated.

Note that a counter for the number of times of charging and discharging a battery or a counter for removing a coating may be provided in the controller 12, and a battery charge and discharge sensor or a coating removal sensor may be provided in the maintenance information acquisitor 15. In this case, in the maintenance information acquisitor 15, the battery charge sensor may detect charge and discharge of a built-in battery, the coating removal sensor may detect removal of a coating of an optical fiber, charge and discharge information and coating removal information based on the detection result may be output to the controller 12, and the counter for the number of times of charging and discharging a battery or the counter for removing a coating in the controller 12 may count the number of times of charging and discharging the built-in battery and the number of times of use of the coating removal blade 24. Alternatively, the counter for the number of times of charging and discharging a battery or the counter for removing a coating may be provided in the controller 32 of the fusion splicer 3, and the counter for the number of times of charging and discharging a battery or the counter for removing a coating may count the number of times of charging and discharging the built-in battery and the number of times of use of the coating removal blade 24. In this case, the maintenance information acquisitor 15 only needs to transmit the number of times of charging and discharging the built-in battery and the number of times of use of the coating removal blade 24 detected by the battery charge and discharge sensor and the coating removal sensor to the controller 32 of the fusion splicer 3 via the controller 12 or the like.

Figure 17:
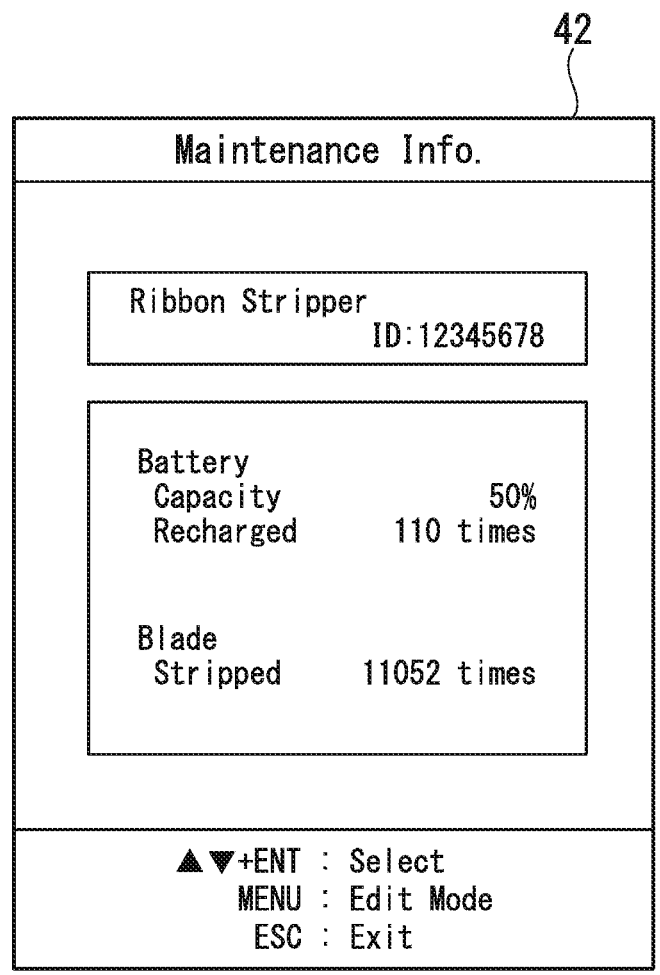
FIG. 17 is a diagram illustrating a maintenance information display screen displayed on the display of the fusion splicer.

An operator can view maintenance information by displaying the maintenance information display screen illustrated in FIG. 17 on the display monitor 42 of the fusion splicer 3. The maintenance information display screen illustrated in FIG. 17 is displayed, for example, by operation of the input key 43 in the fusion splicer 3 by an operator. Various kinds of information included in the identification information and maintenance information are displayed on the maintenance information display screen. Among these pieces of information, the ID number (Ribbon Stripper ID) of the coating removal device 2 is displayed as the identification information, and a capacity of a built-in battery (Battery Capacity), the number of times of charge (Battery Recharged) thereof, and the number of times of use of the coating removal blade 24 (Blade Stripped) in the coating removal device 2 are displayed as the maintenance information. On the maintenance information display screen illustrated in FIG. 17, a capacity of a built-in battery is displayed as 50%, the number of times of charge thereof is displayed as 110 times, and the number of times of use of the coating removal blade 24 is displayed as 11052 times in the coating removal device 2.

Figure 18:
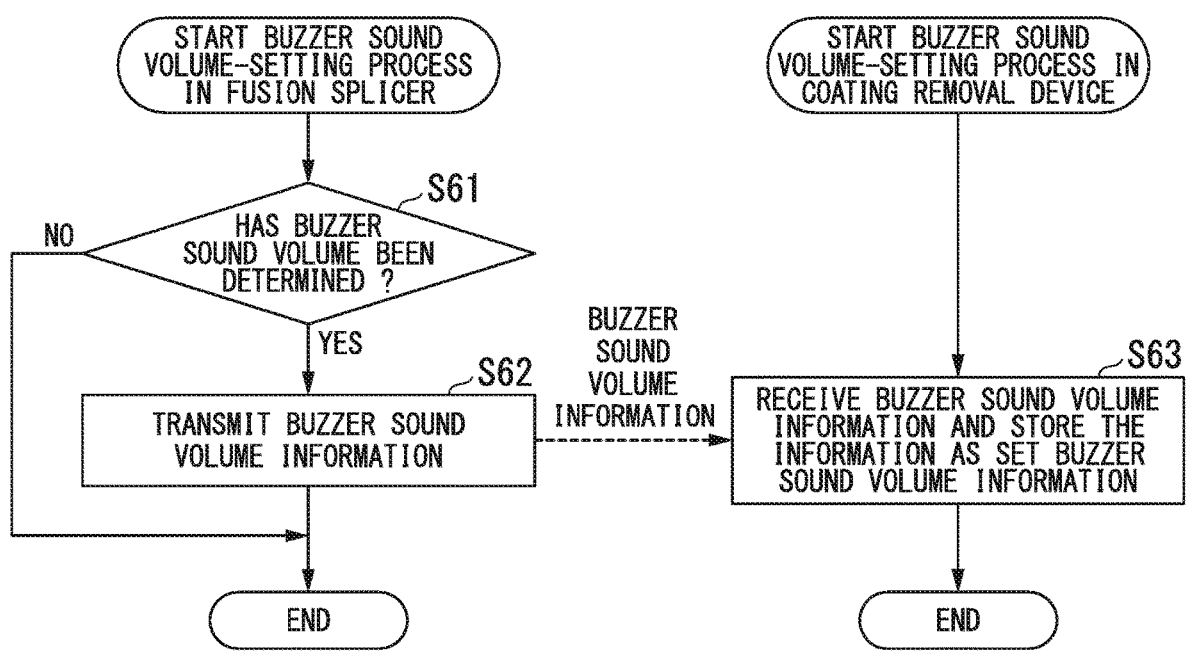
FIG. 18 is a flowchart illustrating a procedure of a buzzer sound volume-setting process.

The buzzer sound volume-setting process is performed in accordance with the flowchart illustrated in FIG. 18. As illustrated in FIG. 18, in the buzzer sound volume-setting process, the controller 32 of the fusion splicer 3 determines whether the buzzer sound volume has been determined (step S61). As a result, when the buzzer sound volume has not been determined (step S61; NO), the buzzer sound volume-setting process is terminated as it is.

Figure 19:
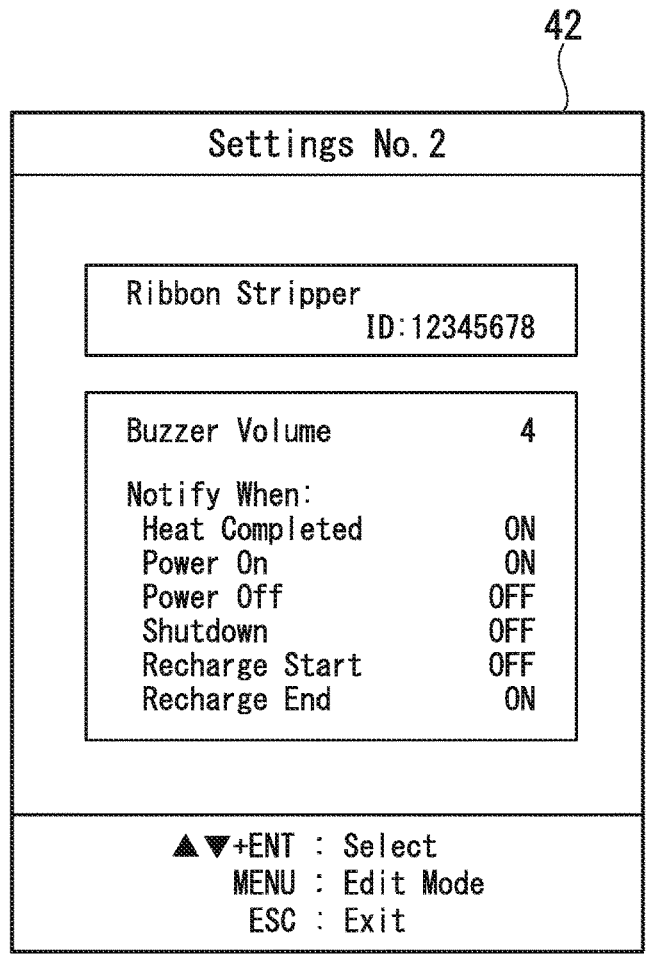
FIG. 19 is a diagram illustrating a buzzer information-setting screen displayed on the display of the fusion splicer.

An operator can set a buzzer sound volume of the coating removal device 2 by displaying the buzzer information-setting screen illustrated in FIG. 19 on the display monitor 42 of the fusion splicer 3. The buzzer information-setting screen illustrated in FIG. 19 is displayed, for example, by operation of the input key 43 in the fusion splicer 3 by an operator. On the buzzer information-setting screen, the ID number (Ribbon Stripper ID) of the coating removal device 2 as the identification information, a buzzer sound volume (buzzer volume), and a buzzer sound generation condition candidate are displayed. As the buzzer sound generation condition candidate, "Heat Completed", "Power On", "Power Off", "Shut Down", "Recharge Start", and "Recharge End" are defined. By operation of the input key 43 in the fusion splicer 3 by an operator, the operator can set a buzzer sound volume as a buzzer sound volume-setting instruction, and can select a buzzer sound generation condition from among the buzzer sound generation condition candidates. On the buzzer information-setting screen illustrated in FIG. 19, the buzzer sound volume is displayed as "4", and "Heat Completed", "Power On", and "Recharge End" are selected and displayed as a buzzer sound generation condition. In one or more embodiments, the buzzer sound volume is set to five stages of "1" to "5" such that the volume increases as the number increases. However, regarding the buzzer sound volume, the number of stages may be larger or smaller than five stages. In addition, the buzzer sound volume may be an analog type instead of a digital type in which the steps are divided by integers.

When the buzzer sound volume has been determined (step S61; YES), the controller 32 transmits buzzer sound volume information to the coating removal device 2 via the communicator 34 (step S62). The controller 12 of the coating removal device 2 receives the buzzer sound volume information transmitted from the fusion splicer 3 via the communicator 11, and stores the information in the storage 13 as set buzzer sound volume information (step S63). In this way, the buzzer sound volume-setting process is terminated.

When a buzzer sound generation condition is satisfied after the buzzer sound volume-setting process is terminated, the controller 12 of the coating removal device 2 outputs a buzzer sound from the buzzer sound outputter 16. The buzzer sound generation condition is set by the fusion splicer 3 and transmitted to the coating removal device 2. The coating removal device 2 stores the transmitted buzzer sound generation condition in the storage 13. When the buzzer sound generation condition stored in the storage 13 is satisfied, the controller 12 performs a buzzer sound output process.

Hereinafter, a procedure of the buzzer sound output process is described with reference to FIG. 20. Note that the buzzer sound output process is also performed during execution of the buzzer sound volume-setting process. When a buzzer sound is output during execution of the buzzer sound volume-setting process, the buzzer sound is output with a buzzer sound volume set in the buzzer sound setting process executed before the currently executed buzzer sound setting process.

Figure 20:
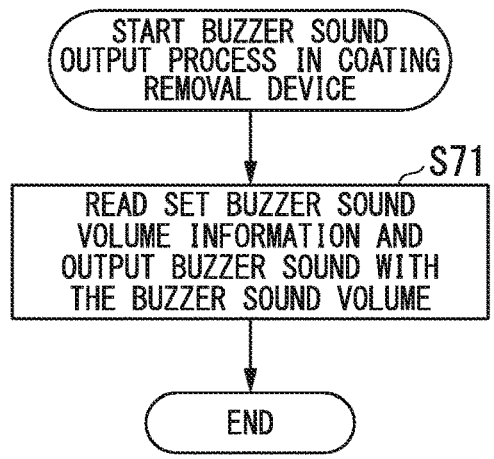
FIG. 20 is a flowchart illustrating a procedure of a buzzer sound output process.

As illustrated in FIG. 20, when the buzzer sound output process is started, the controller 12 reads the set buzzer sound volume information stored in the storage 13, and outputs a buzzer sound from the buzzer sound outputter 16 with a buzzer sound volume corresponding to the read set buzzer sound volume information (step S71). In this way, the buzzer sound output process is terminated.

In a case where a buzzer sound is generated from the buzzer sound outputter 16, when an LED lamp (not illustrated) disposed on a surface of the base 21 lights up or flashes, brightness or a flashing speed of the LED lamp may be adjusted so as to match the magnitude of the buzzer sound. For example, as the buzzer sound volume is larger, the LED lamp may light up brightly, or the flashing speed thereof may be higher. Alternatively, the color of the LED may be changed.

Note that one or more embodiments set a buzzer sound volume of the coating removal device 2 in the fusion splicer 3, but setting is not limited thereto. For example, it is also possible to set the buzzer sound volume of the coating removal device 2 in conjunction with a buzzer sound volume of the fusion splicer 3.

As described above, the optical fiber coating removal system 1 according to one or more embodiments heats a coating of an optical fiber with the heater 14 based on the coating heat condition information transmitted from the fusion splicer 3 into which optical fiber type information to specify an optical fiber type to be subjected to coating heating has been input. Here, the heater 14 can heat a coating of an optical fiber under a plurality of coating heat conditions according to the coating heat condition information.

When the coating removal device 2 removes a coating of an optical fiber, there are suitable coating heat conditions according to an optical fiber type, a coating material, a coating structure, and the like. Therefore, the heater 14 can heat a coating of an optical fiber under a plurality of coating heat conditions according to the coating heat condition information, and an optimum coating heat condition according to an optical fiber type or the like is set in the coating removal device 2. Here, the coating removal device 2 is an device for removing a coating, and therefore is often used under circumstances not necessarily suitable for setting or changing a coating heat condition. Therefore, in some cases, an operation for removing a coating is performed without changing a coating heat condition.

However, the optical fiber coating removal system 1 according to one or more embodiments heats a coating of an optical fiber with the heater 14 based on the coating heat condition information transmitted from the fusion splicer 3 into which optical fiber type information to specify an optical fiber type to be subjected to coating heating has been input. Therefore, the fusion splicer 3 can perform an operation of changing a setting of a coating heat condition. Therefore, labor for an operation of changing a setting of a coating heat condition can be reduced, and forgetting the setting change operation can be suppressed.

Even when a set coating heat condition is stored in the storage of the coating removal device 2, the coating removal device 2 can change a set coating heat condition already stored as a set coating heat condition to coating heat condition information further acquired. Therefore, in a situation where a plurality of coating heat conditions is stored, a set coating heat condition can be easily changed.

In addition, the coating removal device 2 shifts to a power-saving state based on power-saving information received by the communicator 11, and sets stop of preheating of the heater 14. Therefore, it is possible to contribute to energy saving when the coating removal device 2 is used. When the fusion splicer 3 is switched to a built-in battery, the controller 32 starts a power-saving operation and transmits power-saving information to the coating removal device 2. Therefore, when the fusion splicer 3 starts a power-saving operation, the coating removal device 2 can also automatically start a power-saving operation.

Furthermore, the coating removal device 2 receives power supply from the fusion splicer 3. Therefore, when the fusion splicer 3 is switched to a built-in battery, start of a power-saving operation by the coating removal device 2 can suppress consumption of the built-in battery in the fusion splicer 3. Furthermore, when the coating removal device 2 is switched to a built-in battery, start of a power-saving operation can suppress consumption of the built-in battery in the coating removal device 2.

Note that in one or more embodiments, start of a power-saving operation by the coating removal device 2 sets stop of preheating of the heater 14. However, instead of stop of preheating, the preheat temperature of the heater 14 may be lowered, or the heater 14 may be intermittently heated. For example, when a power-saving operation is performed, the preheat temperature of the heater 14 may be set to several % of a temperature set by the fusion splicer 3, for example, to 40%, or ON-OFF of the heater 14 may be repeated every 30 seconds.

In addition, the coating removal device 2 generates a buzzer sound from the buzzer sound outputter 16 when a buzzer sound generation condition is satisfied. A volume of a buzzer sound can be arbitrarily set. However, the buzzer sound outputter 16 can output a buzzer with a buzzer sound volume based on the buzzer sound volume information received by the communicator 11. Therefore, the fusion splicer 3 can perform an operation for setting a buzzer sound volume, and therefore the operation for setting a buzzer sound volume can be performed easily.

As described above, by transmitting information based on a power-saving operation-setting instruction or information based on a buzzer sound volume-setting instruction from the fusion splicer 3 to the coating removal device 2 using a communication function, device setting of the coating removal device is automatically changed according to device setting of the fusion splicer.

In addition, the coating removal device 2 acquires maintenance information such as a capacity of a built-in battery, the number of times of charging and discharging the built-in battery, the number of times of use of the coating removal blade 24, or occurrence of abnormality in the maintenance information acquisitor 15. The communicator 11 transmits information based on the maintenance information to the fusion splicer 3. The controller 32 outputs the maintenance information to the display monitor 42 using the received information based on the maintenance information and information based on the identification information. The coating removal device 2 is miniaturized so as to facilitate an operation of removing a coating, and therefore a means for outputting various kinds of information is limited. On the other hand, the display monitor 42 capable of arranging and displaying various kinds of information is disposed in the fusion splicer 3. Therefore, by transmitting information based on the maintenance information including many items to the fusion splicer 3, the maintenance information can be output to the display monitor 42. Therefore, an operator can easily confirm the maintenance information of the coating removal device 2. As a result, an operator can easily perform maintenance management (for example, exchange of a coating removal blade or a battery and charge of a battery) of the coating removal device 2 based on the displayed maintenance information of the coating removal device 2.

As in the first modified example and the second modified example, when a coating heat condition is not stored in the fusion splicer 3 but stored in the coating removal device 2, the coating removal device 2 may transmit set coating heat condition information to the fusion splicer 3, and the display monitor 42 of the fusion splicer 3 may output the set coating heat condition information. In this case, an operator can easily confirm the set coating heat condition.

In addition, the coating removal device 2 transmits the ID number of its own identification information or the like to the fusion splicer 3. Therefore, the fusion splicer 3 can discriminate the coating removal device 2 easily. In particular, a plurality of the coating removal devicees 2 may be connected to the fusion splicer 3 to be used. In such a case, information on the plurality of coating removal devicees 2 is collected in the fusion splicer 3, but by transmitting identification information, the plurality of coating removal devicees 2 can be easily discriminated.

In one or more embodiments, the external device is the fusion splicer 3. The fusion splicer 3 is an device capable of fusion-splicing an optical fiber from which a coating has been removed with the coating removal device 2. Furthermore, the fusion splicer 3 transmits coating heat condition information included in a connection program selected to the coating removal device 2 by selection of a connection program. Therefore, steps from removing a coating of an optical fiber to fusion-splicing the optical fiber can be executed continuously because the external device is the fusion splicer 3. A plurality of connection programs for connecting optical fibers is stored in the fusion splicer 3. By inclusion of coating heat conditions in the plurality of connection programs, the fusion splicer 3 can change setting by selecting a coating heat condition easily.

The storage 13 of the coating removal device 2 stores a coating heat condition setting of which has been changed using information based on optical fiber type information such as a program number and coating information transmitted from the fusion splicer 3 for performing the coating heat condition-setting process according to the first modified example or the second modified example as a set coating heat condition. The communicator 11 of the coating removal device 2 transmits the set coating heat condition information stored in the storage 13 to the fusion splicer 3. The fusion splicer 3 may display the received set coating heat condition information on the display monitor 42. In this case, the set coating heat condition information in the coating removal device 2 can be displayed on the display monitor 42 of the fusion splicer 3 largely or clearly. Therefore, an operator can easily confirm the set coating heat condition information.

Incidentally, in the above present embodiments, information in the fusion splicer 3 and the coating removal device 2 is transmitted and received in a wired manner via the power cord 4. However, transmission and reception may be performed in a wireless manner. As a coating heat condition, coating heat temperature and coating heat time are used, but either one of the coating heat temperature and the coating heat time may be used.

Second Example

Next, an optical fiber coating removal system according to a second example of the present invention is described with reference to the drawings. The optical fiber coating removal system according to the second example is different from that according to the first example mainly in that a mobile terminal is used in the second example instead of a fusion splicer. A coating removal device 2 is different from the coating removal device 2 according to the first example mainly in that information stored in a storage 13 and control by a controller 12 are different. Hereinafter, embodiments of the second example are described focusing on a difference from embodiments of the first example. Common members and elements are denoted by the same reference signs, and description thereof may be omitted.

Figure 21:
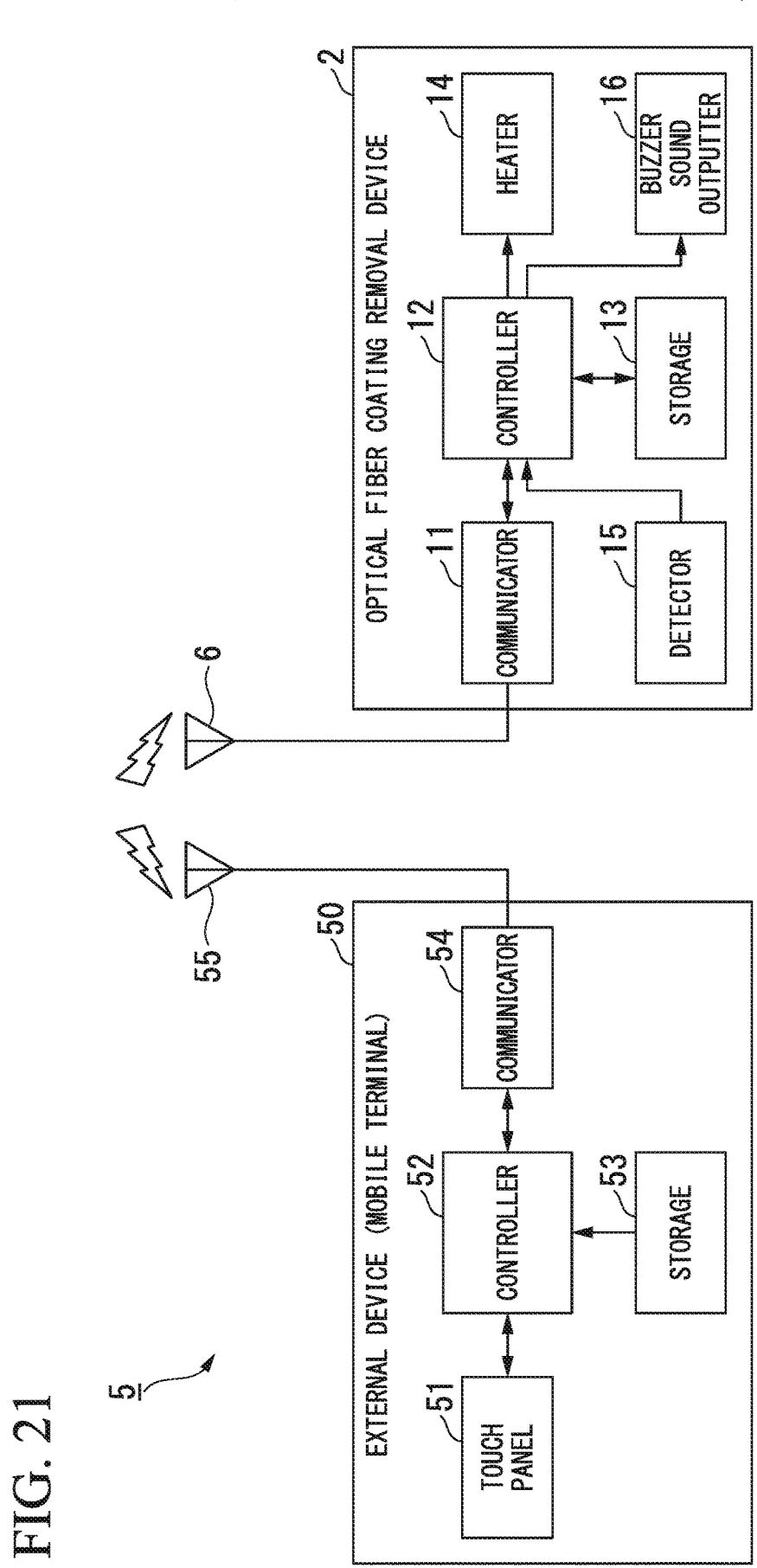
FIG. 21 is a block diagram illustrating an optical fiber coating removal system including an optical fiber coating removal device according to a second example of the present invention.

As illustrated in FIG. 21, an optical fiber coating removal system 5 includes the coating removal device 2 and a mobile terminal 50 which is an external device. As in the first example, the coating removal device 2 includes a communicator 11, the controller 12, the storage 13, a heater 14, a maintenance information acquisitor 15, and a buzzer sound outputter 16. Note that the communicator 11 is different from that in the first example in that an antenna 6 is connected to the communicator 11 instead of the power cord 4. The external device is the mobile terminal 50 possessed by an operator or the like. The mobile terminal 50 includes a touch panel 51, a controller 52, a storage 53, and a communicator 54. An internal antenna 55 is connected to the communicator 54.

Figure 22:
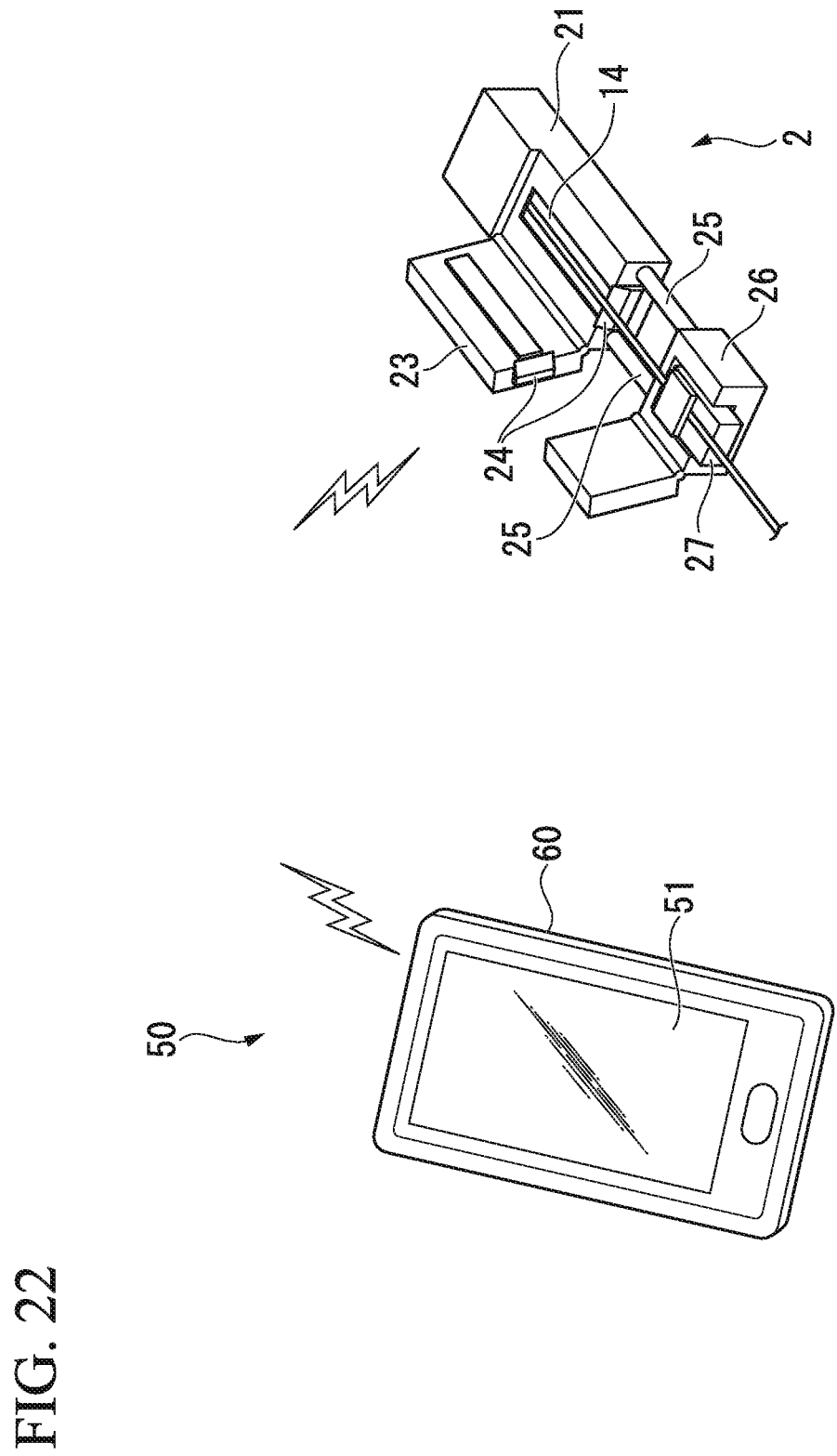
FIG. 22 is a perspective view of the optical fiber coating removal system according to the second example.

As illustrated in FIG. 22, the mobile terminal 50 is a so-called smartphone and includes a housing 60. A touch panel 51 is attached to the housing 60. The controller 52, the storage 53, the communicator 54, and the internal antenna 55 are disposed in the housing 60, and a built-in battery (not illustrated) is housed therein.

The touch panel 51 of the mobile terminal 50 displays an image corresponding to control of the controller 52. By performing an operation such as tapping, flicking, swiping, or pinching-in on the touch panel 51 in accordance with an image displayed on the touch panel 51, the touch panel 51 outputs information corresponding to an operation such as tapping to the controller 52. The touch panel 51 displays and outputs various kinds of information such as a connection program and maintenance information based on information or the like output from the controller 52.

The controller 52 performs various setting processes and the like based on various kinds of information output from the touch panel 51 and various kinds of information transmitted from the communicator 11 of the coating removal device 2 via the internal antenna 55 and output from the communicator 54 of the mobile terminal 50. The controller 32 outputs various kinds of information to the touch panel 51, the storage 53, the communicator 54, and the like based on the above process results and the like.

The storage 53 stores various kinds of information necessary for removing a coating in the coating removal device 2. The controller 52 stores various kinds of information such as a set coating heat condition in the storage 53. The controller 52 reads various kinds of information such as the set coating heat condition stored in the storage 53 as necessary.

The communicator 54 is connected to the controller 52 and the internal antenna 55. The communicator 54 outputs various kinds of information transmitted from the communicator 11 of the coating removal device 2 via the internal antenna 55 and the antenna 6 disposed in the coating removal device 2 to the controller 52. The communicator 54 transmits various kinds of information output from the controller 32 to the communicator 11 of the coating removal device 2 via the internal antenna 55 and the antenna 6.

The optical fiber coating removal system 5 according to one or more embodiments performs a coating heat condition-setting process for removing a coating in the coating removal device 2, including an operation of the mobile terminal 50 and the like. Hereinafter, a procedure of the coating heat condition-setting process in the optical fiber coating removal system 5 according to one or more embodiments is described with reference to FIG. 23.

Figure 23:
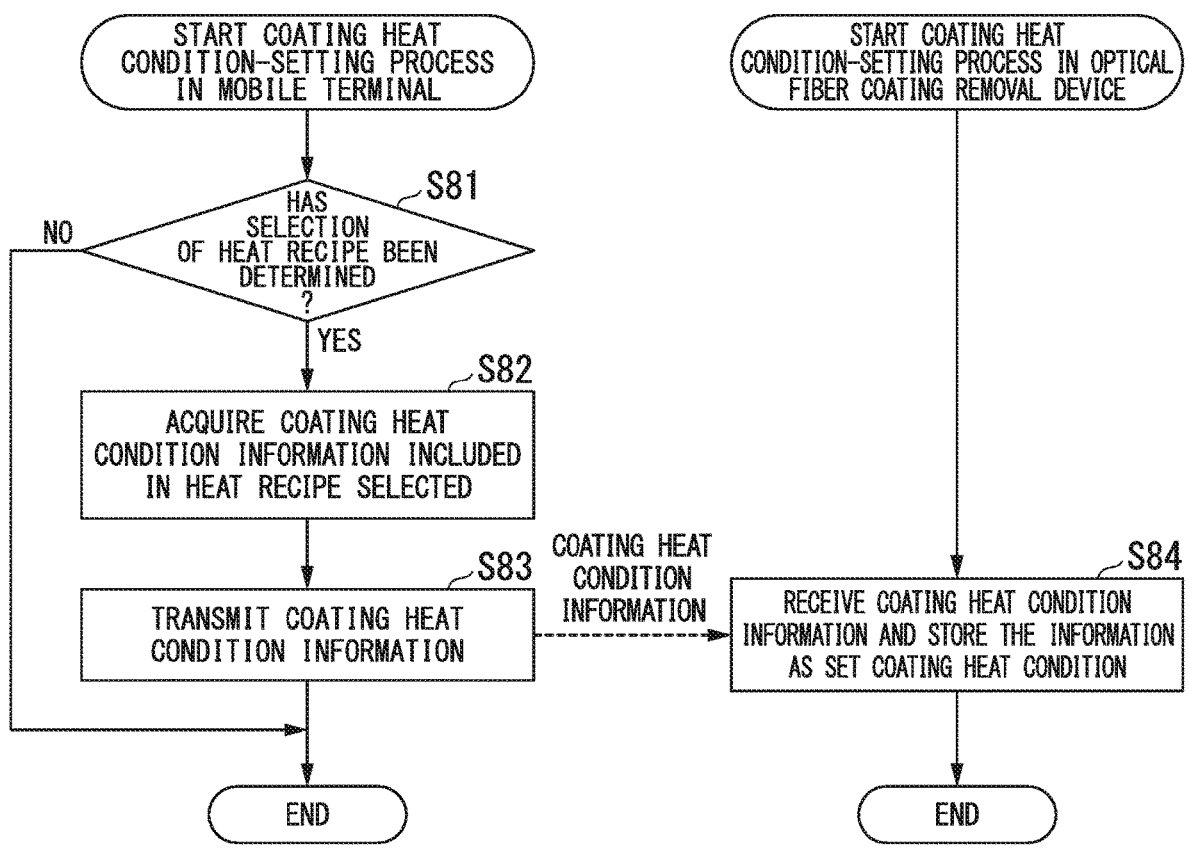
FIG. 23 is a flowchart illustrating a procedure of a coating heat process of the second example.

As illustrated in FIG. 23, in the coating heat condition-setting process, the controller 52 of the mobile terminal 50 determines whether selection of a heat recipe has been determined (step S81). As a result, when selection of a heat recipe has not been determined (step S81; NO), the coating heat condition-setting process is terminated as it is.

The mobile terminal 50 stores a plurality of heat recipes for defining a coating heat condition for removing a coating of an optical fiber. A heat recipe number is assigned to each of the plurality of heat recipes. When a heat recipe is selected, as illustrated in FIG. 24, the touch panel 51 of the mobile terminal 50 displays the ID number of the coating removal device 2, a heat recipe number for each of the plurality of heat recipes, a heat recipe name, and a coating heat condition.

Figure 24:
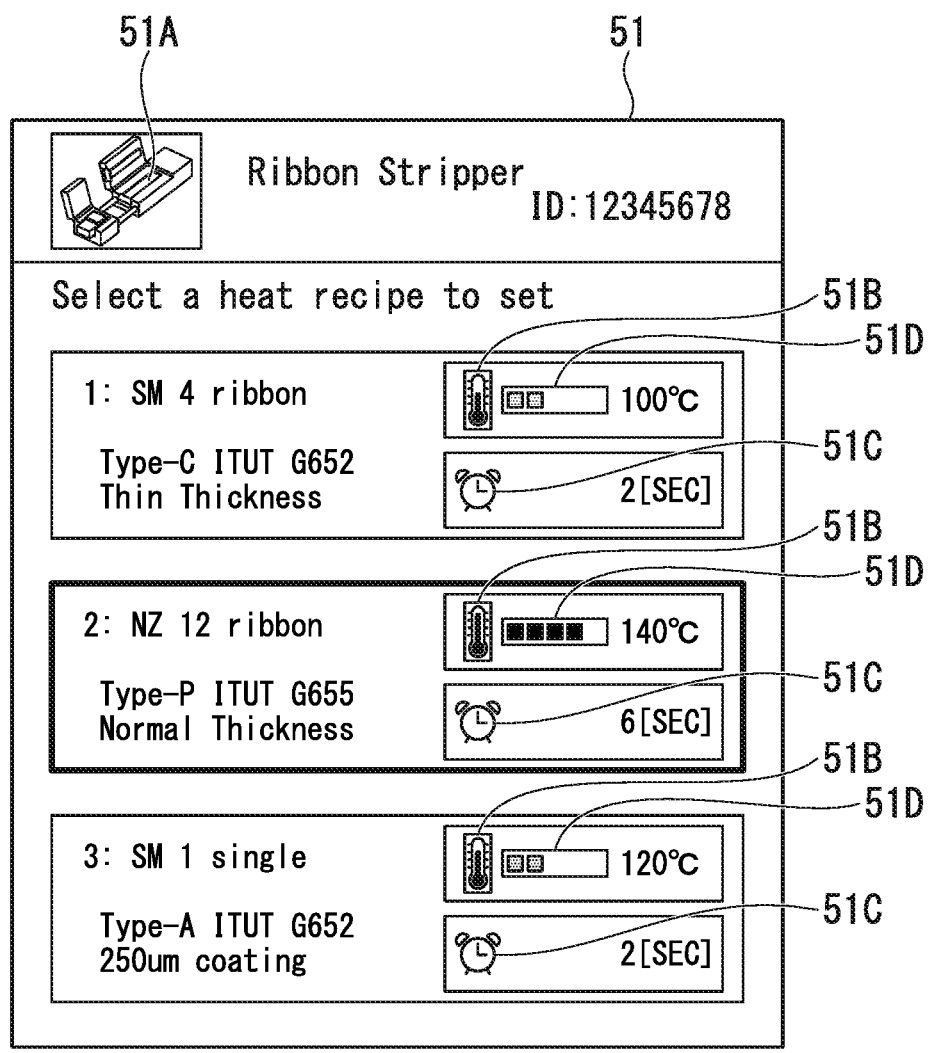
FIG. 24 is a diagram illustrating a touch panel of a mobile terminal displaying recipe names of a plurality of heat recipes and coating heat conditions thereof.

In the example illustrated in FIG. 24, the touch panel 51 displays the IC number of the coating removal device 2 and three heat recipes. For a heat recipe, a heat recipe name, coating heat temperature, and coating heat time are displayed. In addition, the ID number of the coating removal device 2, the coating heat temperature, and the coating heat time are displayed together with a coating removal device icon 51A, a thermometer icon 51B, and a clock icon 51C, respectively.

"SM4ribbon Type-C ITUT G652" is displayed as a recipe name for a heat recipe of the heat recipe number 1. A temperature of 100° C. is displayed as the coating heat temperature together with a meter icon 51D on the right side of the thermometer icon 51B, and 2 sec is displayed as the coating heat time on the right side of the clock icon 51C.

"NZ12ribbon Type-P ITUT G655" is displayed as a recipe name for a heat recipe of the heat recipe number 2. A temperature of 140° C. is displayed as the coating heat temperature together with the meter icon 51D on the right side of the thermometer icon 51B, and 6 sec is displayed as the coating heat time on the right side of the clock icon 51C.

"SM1single Type-A ITUT G652" is displayed as a recipe name for a heat recipe of the heat recipe number 3. A temperature of 120° C. is displayed as the coating heat temperature together with the meter icon 51D on the right side of the thermometer icon 51B, and 2 sec is displayed as the coating heat time on the right side of the clock icon 51C.

By operating the touch panel 51, an operator can select and determine a heat recipe. The example illustrated in FIG. 24 is in a state in which an operator has tapped the heat recipe number 2, and the heat recipe of the heat recipe number 2 has been selected. By double-tapping the heat recipe number 2 in this state, selection of the heat recipe of the heat recipe number 2 is determined. In this way, by operation of the touch panel 51 by an operator, a heat recipe is selected and determined. For example, when the heat recipe number 2 illustrated in FIG. 24 is double-tapped, the heat recipe of the heat recipe number 2 is determined. The touch panel 51 inputs a series of input information to the touch panel 51 up to that point as optical fiber type information selected by a user (operator) from among a plurality of optical fiber types, and outputs the information to the controller 52. The controller 32 specifies an optical fiber type selection of which has been determined based on the optical fiber type information. For example, when the heat recipe number 2 is double-tapped in the state illustrated in FIG. 24, the controller 32 specifies the type of an optical fiber included in the connection program "NZ12ribbon Type-P ITUT G655".

When selection of a heat recipe has been determined in step S81 (step S81; YES), the controller 52 reads coating heat condition information included in a heat recipe selected from the storage 53 (step S82). The heat recipe stored in the storage 53 includes items displayed on the touch panel 51. Specifically, the heat recipe includes items of the heat recipe number, the heat recipe name, the coating heat temperature, and the coating heat time illustrated in FIG. 25. The controller 52 reads a coating heat condition corresponding to the determined heat recipe, in this case, a coating heat condition included in the heat recipe of the heat recipe number 3 from the storage 53.

Subsequently, the controller 52 transmits coating heat condition information corresponding to the read coating heat condition to the coating removal device 2 via the communicator 54 and the internal antenna 55 (step S83). The coating removal device 2 performs a process of waiting for transmission of coating heat condition information from the mobile terminal 50 when starting a coating heat condition-setting process. When the coating heat condition information is transmitted, the controller 12 of the coating removal device 2 receives the coating heat condition information transmitted from the mobile terminal 50 via the antenna 6 and the communicator 11, and stores the information in the storage 13 as a set coating heat condition (step S84). In this way, the coating heat condition-setting process is terminated.

In a case where the coating removal device 2 removes a coating of an optical fiber after the coating heat condition-setting process is terminated, when a detection unit (not illustrated) detects that the lid member 23 has been closed, the controller 12 heats the heater 14 to heat a coating of an optical fiber. The coating heat process is performed in a similar procedure to the first example.

Figure 26:
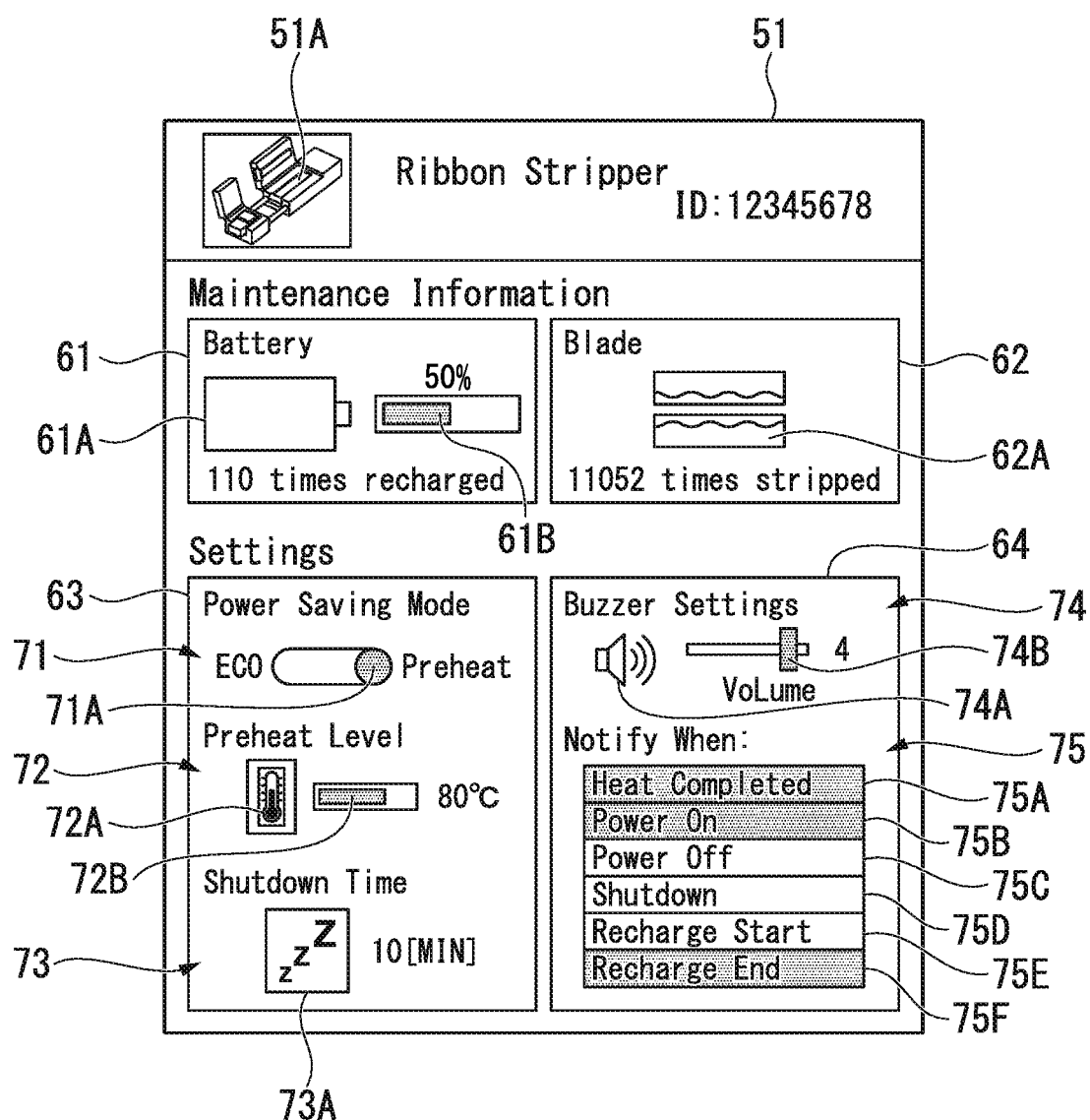
FIG. 26 is a diagram illustrating a touch panel of a mobile terminal displaying maintenance information, power-saving information, and buzzer sound volume information.

As illustrated in FIG. 26, the mobile terminal 50 can display an information display-setting screen. On the information display-setting screen, a first maintenance information display unit 61, a second maintenance information display unit 62, a power-saving setting display unit 63, and a buzzer information-setting display unit 64 are displayed. On the first maintenance information display unit 61, a capacity of a built-in battery and the number of times of charge thereof in the coating removal device 2 are displayed as maintenance information. In the first maintenance information display unit 61, a battery icon 61A is displayed, and the capacity of a built-in battery in the coating removal device 2 is displayed as 50% together with a meter icon 61B on the right side of the battery icon 61A. The number of times of charge of a built-in battery in the coating removal device 2 is displayed below the battery icon 61A.

In the second maintenance information display unit 62, the number of use of the coating removal blade 24 is displayed as maintenance information. In the second maintenance information display unit 62, a coating removal blade icon 62A is displayed, the number of times of use of the coating removal blade 24 is displayed below the coating removal blade icon 62A, and the number of times of use of the coating removal blade 24 is displayed as 11052 times.

The power-saving setting display unit 63 includes a power-saving mode setting unit 71, a preheat temperature setting unit 72, and a shutdown time setting unit 73. In the power-saving mode setting unit 71, a movement symbol 71A is displayed, characters of "Preheat" meaning a normal state in which a power-saving operation is not performed are displayed on the right side of the movement symbol 71A, and characters of "ECO" meaning a power-saving state in which a power-saving operation is performed are displayed on the left side thereof. By swiping the touch panel 51 and moving the movement symbol 71A to the right side, an operator can turn OFF the power-saving mode and can set a normal state in which a power-saving operation is not performed. In addition, by swiping the touch panel 51 and moving the movement symbol 71A to the left side, an operator can set a power-saving state in which a power-saving operation is performed.

A thermometer icon 72A and a meter icon 72B are displayed on the preheat temperature setting unit 72. The meter icon 72B is displayed on the right side of the thermometer icon 72A. A temperature corresponding to the position of the meter icon 72B, in this case, a temperature of 80° C. is displayed on the right side of the meter icon 72B. By swiping the touch panel 51 and moving the right end portion of the meter icon 72B, an operator can set a preheat temperature which is power-saving information. By moving the right end portion of the meter icon 72B to the right side, the preheat temperature rises. By moving the right end portion of the meter icon 72B to the left side, the preheat temperature falls.

On the shutdown time setting unit 73, a shutdown icon 73A is displayed. Shutdown time, in this case, 10 minutes is displayed on the right side of the shutdown icon 73A. By flicking the shutdown icon 73A, an operator can set shutdown time which is power-saving information. By flicking the shutdown icon 73A to the lower side, the shutdown time becomes shorter. By flicking the shutdown icon 73A to the upper side, the shutdown time becomes longer.

The buzzer information-setting display unit 64 includes a buzzer sound volume-setting unit 74 and a buzzer information-setting unit 75. A speaker icon 74A is displayed on the buzzer sound volume-setting unit 74. A volume meter icon 74B is displayed on the right side of the speaker icon 74A. A buzzer sound volume corresponding to the position of the volume meter icon 74B, in this case, "4" as a buzzer sound volume is displayed on the right side of the volume meter icon 74B. By swiping the touch panel 51 and moving the volume meter icon 74B, a buzzer sound volume can be set. By moving the volume meter icon 74B to the right side, the buzzer sound volume is increased. By moving the volume meter icon 74B to the left side, the buzzer sound volume is reduced.

The buzzer information-setting unit 75 is partitioned into a Heat Completed area 75A, a Power On area 75B, a Power Off area 75C, a Shut Down area 75D, a Recharge Start area 75E, and a Recharge End area 75F as areas corresponding to buzzer sound generation condition candidates. By tapping each area of the buzzer information-setting unit 75, an operator can switch a buzzer sound generation condition. In the example illustrated in FIG. 26, "Heat Completed", "Power On" and "Recharge End" are set as a buzzer sound generation condition, and the background color of the Heat Completed area 75A, the Power On area 75B, and the Recharge End area 75F is different from that of the Power Off area 75C, the Shut Down area 75D, and the Recharge Start area 75E. Here, for example, by tapping the Power Off area 75C, the power Off is set as a buzzer sound generation condition. By tapping the Recharge End area 75F, recharge end is excluded from a buzzer sound generation condition.

As described above, the optical fiber coating removal system 5 according to one or more embodiments exhibits an action and an effect similar to one or more embodiments of the first example. For example, the heater 14 heats a coating of an optical fiber using coating heat condition information transmitted from the mobile terminal 50. Therefore, the mobile terminal 50 can perform an operation of changing a setting of a coating heat condition. Therefore, labor for an operation of changing a setting of a coating heat condition can be reduced, and forgetting the setting change operation can be suppressed.

In one or more embodiments, a coating heat condition in the coating removal device 2 can be set in a wireless manner using the mobile terminal 50. Therefore, a coating heat condition of the coating removal device 2 can be set also from a position other than a site where an operation for removing a coating is performed with the coating removal device 2. Therefore, even when an operator has poor knowledge concerning removal of a coating at a site where an operation for removing a coating is performed, an appropriate coating heat condition can be set.

The coating removal device 2 transmits maintenance information or identification information to the mobile terminal 50. The mobile terminal 50 displays the transmitted maintenance information and identification information. Therefore, for example, an operation supervisor possessing the mobile terminal 50 can know maintenance information even at a position away from a site where an operation for removing a coating is performed. Therefore, even when an operator has poor knowledge concerning removal of a coating at a site where an operation for removing a coating is performed, an instruction for an appropriate maintenance operation can be issued to the operator. Due to transmission of identification information, when there is a plurality of pairs of the coating removal device 2 and the mobile terminal 50, a trouble such as transmission of information transmitted from a predetermined pair of the coating removal device 2 and the mobile terminal 50 to another pair of the coating removal device 2 and the mobile terminal 50, for example, occurrence of crosstalk can be also prevented.

Incidentally, in one or more embodiments, the external device is the mobile terminal 50, and wireless communication is performed between the mobile terminal 50 and the coating removal device 2. However, the external device may be, for example, a personal computer, and wired communication may be performed by connecting the personal computer to the coating removal device 2 via a cable or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in the above embodiments, the coating removal device 2 stores a coating heat condition as a set coating heat condition in the storage 13, but the coating heat condition may be used directly for controlling the temperature of the heater 14 without being stored in the storage 13. In the above embodiments, the coating removal device 2 includes the storage 13, but an external storage device may be connected to the coating removal device 2 instead of the storage 13 such that the external storage device can be used instead of the storage 13. In this case, for example, as in the first modified example and the second modified example, when an example in which the storage 13 of the coating removal device 2 stores a coating heat condition is used, a storage medium storing a coating heat condition corresponding to an optical fiber to be subjected to coating removal may be used.

In the above embodiments, when a coating heat condition is set, coating heat information stored in the storage 13 of the coating removal device 2 or the storage 33 of the fusion splicer 3 is used. However, a coating heat condition may be determined by calculation or the like from optical fiber type information, coating information, and the like. For example, when a coating heat condition is determined by calculation from optical fiber type information, the coating heat condition may be determined by calculation using an arithmetic expression to provide a coating heat condition such that a larger discharge heat current and a longer discharge heat time make the coating heat temperature higher and the coating heat time longer. When coating information is used, the coating heat condition may be determined by calculation using an arithmetic expression to provide a coating heat condition such that a larger core number and a larger coating diameter make the coating heat temperature higher and the coating heat time longer.

DESCRIPTION OF THE REFERENCE SYMBOLS 1, 5: Optical fiber coating removal system
2: Optical fiber coating removal device
3: Fusion splicer
4: Cable
6: Antenna
11: Communicator
12: Controller
13: Storage
14: Heater
15: Maintenance information acquisitor
16: Buzzer sound outputter
21: Base
23: Lid member 24: Coating removal blade
25: Slide shaft
26: Clamp portion
27: Fiber holder
31: Inputter
32: Controller
33: Storage
34: Communicator
35: Outputter
50: Mobile terminal
51: Touch panel

The invention claimed is:

1. An optical fiber coating removal device in combination with an external device that heats a coating of an optical fiber with a heater and removes the coating with a blade, comprising:
   a communicator that receives information based on optical fiber type information that specifies an optical fiber type selected by a user from among a plurality of optical fiber types stored in the external device, transmitted from a first storage disposed in the external device to which the optical fiber type information has been input;
   a second storage that stores coating removal information for removing the coating;
   a controller that receives, from the communicator, the information based on optical fiber type information and controls at least one of heat temperature and heat time of the heater based on the coating removal information stored in the second storage; and
   the heater that heats the coating of the optical fiber using the received information based on the optical fiber type information, and heats the coating under a plurality of conditions according to the optical fiber type information.

2. The optical fiber coating removal device in combination with the external device, according to claim 1, wherein
   the optical fiber type information includes coating heat condition information that specifies a coating heat condition of the optical fiber,
   the communicator receives the coating heat condition information as information based on the optical fiber type information, and
   the heater heats the coating of the optical fiber under the coating heat condition specified by the received coating heat condition information.

3. The optical fiber coating removal device in combination with the external device, according to claim 1, wherein
   the communicator receives information based on a power-saving operation-setting instruction for the optical fiber coating removal device, transmitted from the external device, and
   the heater controls preheating of the heater using the received information based on the power-saving operation-setting instruction.

4. The optical fiber coating removal device in combination with the external device, according to claim 1, further comprising a buzzer sound outputter that outputs a buzzer sound, wherein
   the communicator receives information based on a buzzer sound volume-setting instruction for the optical fiber coating removal device, transmitted from the external device,
   the buzzer sound outputter outputs the buzzer sound using the received information based on the buzzer sound volume-setting instruction, and
   the buzzer sound outputter outputs the buzzer sound with a plurality of buzzer sound volumes according to the buzzer sound volume-setting instruction.

5. The optical fiber coating removal device in combination with the external device, according to claim 1, further comprising a maintenance information acquisitor that acquires at least one or more of a capacity of a built-in battery, a number of times of charging and discharging the built-in battery, a number of times of use of the blade, and occurrence of abnormality, serving as maintenance information, wherein
   the communicator transmits information based on the acquired maintenance information, and
   the external device outputs the maintenance information using the received information based on the maintenance information.

6. The optical fiber coating removal device in combination with the external device, according to claim 1, wherein
   the communicator transmits information based on identification information of the optical fiber coating removal device, and
   the external device outputs the identification information of the optical fiber coating removal device using the received information based on the identification information.

7. The optical fiber coating removal device in combination with the external device, according to claim 1, wherein
   the external device is a fusion splicer that performs fusion splicing using a connection program selected out of a plurality of connection programs corresponding to optical fiber types, and inputs information of the optical fiber type included in the connection program selected as the optical fiber type information.

8. The optical fiber coating removal device in combination with the external device, according to claim 2, wherein
   the connection program selected further includes the coating heat condition information of the optical fiber,
   the communicator receives the coating heat condition information transmitted from a fusion splicer as information based on the optical fiber type information, and
   the heater heats the coating of the optical fiber using the received coating heat condition information under the coating heat condition specified by the coating heat condition information.

9. The optical fiber coating removal device in combination with the external device, according to claim 1, wherein
   the second storage stores the received coating heat condition information as set coating heat condition information, the set coating heat condition information includes the heat temperature and the heat time,
   the communicator transmits the set coating heat condition information, and
   the external device outputs the received coating heat condition information.

10. An external device in combination with an optical fiber removal device, that inputs information used for heating a coating in the optical fiber coating removal device that heats a coating of an optical fiber with a heater and removes the coating with a blade, comprising:
    an inputter that inputs optical fiber type information that specifies an optical fiber type selected by a user from among a plurality of optical fiber types;
    a first storage that stores at least one connection program that comprises a discharge heat current for connecting optical fibers; and
    a communicator that transmits information based on the input optical fiber type information, wherein the optical fiber coating removal device comprises:
- a second storage that stores coating removal information for removing the coating;
- a controller that receives the information based on optical fiber type information and controls at least one of heat temperature and heat time of the heater based on the coating removal information stored in the second storage; and
- the heater that heats the coating of the optical fiber using the received information based on the optical fiber type information, and heats the coating under a plurality of conditions according to the optical fiber type information.

11. The external device in combination with an optical fiber removal device, according to claim 10, wherein
the optical fiber type information includes coating heat condition information that specifies a coating heat condition of the heater,
the communicator transmits the coating heat condition information included in the input optical fiber type information, and
the optical fiber coating removal device receives the coating heat condition information, and heats the coating of the optical fiber using the received coating heat condition information under the coating heat condition specified by the coating heat condition information.

12. The external device in combination with an optical fiber removal device, according to claim 10, further comprising an outputter that outputs information, wherein
the optical fiber coating removal device detects at least one or more of a capacity of a built-in battery, the number of times of charging and discharging the built-in battery, a number of times of use of the blade, and occurrence of abnormality, serving as maintenance information, and transmits information based on the detected maintenance information,
the communicator receives information based on the maintenance information, and
the outputter outputs the maintenance information based on the received information based on the maintenance information.

13. The external device in combination with an optical fiber removal device, according to claim 10, wherein the external device is a fusion splicer that performs fusion splicing using a connection program selected out of a plurality of connection programs corresponding to optical fiber types, and inputs information of the optical fiber type included in the connection program selected as the optical fiber type information.

14. The external device in combination with an optical fiber removal device, according to claim 13, wherein
the connection program selected further includes coating heat condition information of the optical fiber,
the optical fiber coating removal device receives the coating heat condition information transmitted from the fusion splicer as the optical fiber type information, and
the heater heats the coating of the optical fiber using the received coating heat condition information under a coating heat condition specified by the coating heat condition information.

15. An optical fiber coating removal system in combination with an external device comprising:
an optical fiber coating removal device that heats a coating of an optical fiber with a heater and removes the coating with a blade; and
the external device that inputs information used for heating a coating in the optical fiber coating removal device, wherein
the external device includes:
- an inputter that inputs optical fiber type information that specifies an optical fiber type selected by a user from among a plurality of optical fiber types stored in the external device;
- a first storage that stores at least one connection program that comprises a discharge heat current for connecting optical fibers; and
- a first communicator that transmits information based on the input optical fiber type information, the optical fiber coating removal device includes:
- a second communicator that receives information based on the optical fiber type information transmitted from the external device; and
- a second storage that stores coating removal information for removing the coating; and
- a controller that receives, from the communicator, the information based on optical fiber type information and controls at least one of heat temperature and heat time of the heater based on the coating removal information stored in the second storage; and
- the heater heats the coating of the optical fiber using the received information based on the optical fiber type information and heats the coating under a plurality of conditions according to the optical fiber type information.

16. An optical fiber coating removal method using an optical fiber coating removal device in combination with an external device, that heats a coating of an optical fiber with a heater and removes the coating with a blade, and an external device that inputs information used for heating a coating in the optical fiber coating removal device, comprising:
inputting optical fiber type information that specifies an optical fiber type selected by a user from among a plurality of optical fiber types stored in a first storage disposed in the external device, executed by the external device;
transmitting information based on the input optical fiber type information, executed by the external device;
receiving information based on the optical fiber type information transmitted from the external device, executed by the optical fiber coating removal device;
storing coating removal information for removing the coating in a second storage disposed in the optical fiber coating removal device, executed by the optical fiber coating removal device;
receiving the information based on optical fiber type information and controlling at least one of heat temperature and heat time of the heater based on the stored coating removal information, executed by the optical fiber coating removal device; and
heating the coating of an optical fiber with the heater using the received information based on the optical fiber type information, and heating the coating under a plurality of conditions according to the optical fiber type information in the coating heat step, executed by the heater.

* * * * *